US008888499B2

(12) United States Patent
Goldwater

(10) Patent No.: US 8,888,499 B2
(45) Date of Patent: Nov. 18, 2014

(54) BICYCLE WHEEL SPINNER STAND FOR RETAIL DISPLAY

(71) Applicant: Dan Goldwater, Amherst, MA (US)

(72) Inventor: Dan Goldwater, Amherst, MA (US)

( * ) Notice: Subject to any disclaimer, the term of this patent is extended or adjusted under 35 U.S.C. 154(b) by 112 days.

(21) Appl. No.: 13/693,283

(22) Filed: Dec. 4, 2012

(65) Prior Publication Data
US 2014/0154660 A1    Jun. 5, 2014

(51) Int. Cl.
*G09B 25/00* (2006.01)
*G09F 19/10* (2006.01)

(52) U.S. Cl.
CPC .............. *G09B 25/00* (2013.01); *G09F 19/10* (2013.01)
USPC ........................................................ 434/376

(58) Field of Classification Search
USPC ............ 434/300, 302, 365, 373, 376; 33/203, 33/203.12, 203.13, 203.18; 157/1.55
See application file for complete search history.

(56) References Cited

U.S. PATENT DOCUMENTS

| | | | |
|---|---|---|---|
| 1,886,549 A | 11/1932 | Howell et al. | |
| 1,927,283 A | 9/1933 | Hernandez | |
| 2,861,643 A | 11/1958 | Wald, Jr. et al. | |
| 3,030,815 A | 4/1962 | Lill et al. | |
| 3,611,601 A | 10/1971 | Stropkay et al. | |
| 3,843,000 A | 10/1974 | Bennett | |
| 4,135,229 A * | 1/1979 | Modurkay | 362/473 |
| 4,205,812 A | 6/1980 | McSweeney | |
| 4,532,665 A | 8/1985 | Evans et al. | |
| 4,585,046 A * | 4/1986 | Buckley | 157/1.55 |
| 5,103,414 A * | 4/1992 | Papadopoulos | 700/279 |
| 5,364,271 A * | 11/1994 | Aknin et al. | 434/61 |
| 5,459,930 A * | 10/1995 | Crisick | 33/201 |
| 5,903,224 A * | 5/1999 | Reynolds | 340/815.45 |
| 6,016,101 A * | 1/2000 | Brown | 340/432 |
| 6,492,963 B1 * | 12/2002 | Hoch | 345/39 |
| 6,735,878 B2 * | 5/2004 | Lie | 33/203 |
| 7,000,811 B2 | 2/2006 | Gilstrp et al. | |
| 7,018,156 B2 | 3/2006 | Irby et al. | |
| 7,040,026 B2 * | 5/2006 | Hirano et al. | 33/203.13 |
| 7,992,750 B2 | 8/2011 | Walker | |
| 8,646,330 B2 * | 2/2014 | Lin | 73/462 |
| 2004/0000770 A1 | 1/2004 | Miksik | |
| 2011/0038169 A1 | 2/2011 | Goldwater | |
| 2012/0200401 A1 | 8/2012 | Goldwater | |

OTHER PUBLICATIONS

Print out of web page www.anvii.com/store/ferris_wheel/index.php, Dec. 4, 2012, Anvii Corporation Ltd., Taiwan.

* cited by examiner

*Primary Examiner* — Kurt Fernstrom
(74) *Attorney, Agent, or Firm* — Porter, Wright, Morris & Arthur, LLP

(57) ABSTRACT

A display system includes a bicycle wheel rotatable about an axle, a lighting device secured to the wheel for rotation with the wheel, and a stand device having an attachment location where the axle of the wheel is attached to support the wheel so that the wheel can rotate relative to the stand device. The stand device includes a drive roller engaging the wheel to rotate the wheel and a motor rotating the drive roller. A distance between the attachment location and the drive roller can be adjusted so that the stand device accommodates different sizes of wheels. The motor and the drive roller can be secured to the stand device at a fixed location while the wheel is mounted to a pivoting portion of the stand device so that gravity pivots the wheel in a direction to engage the wheel with the drive roller.

20 Claims, 22 Drawing Sheets

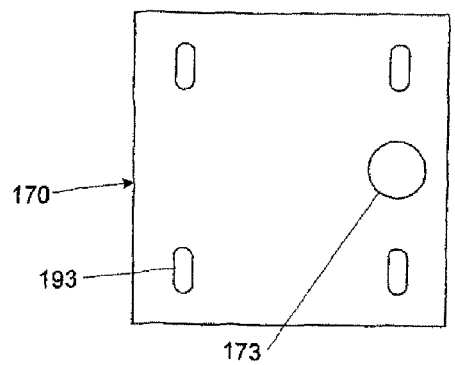
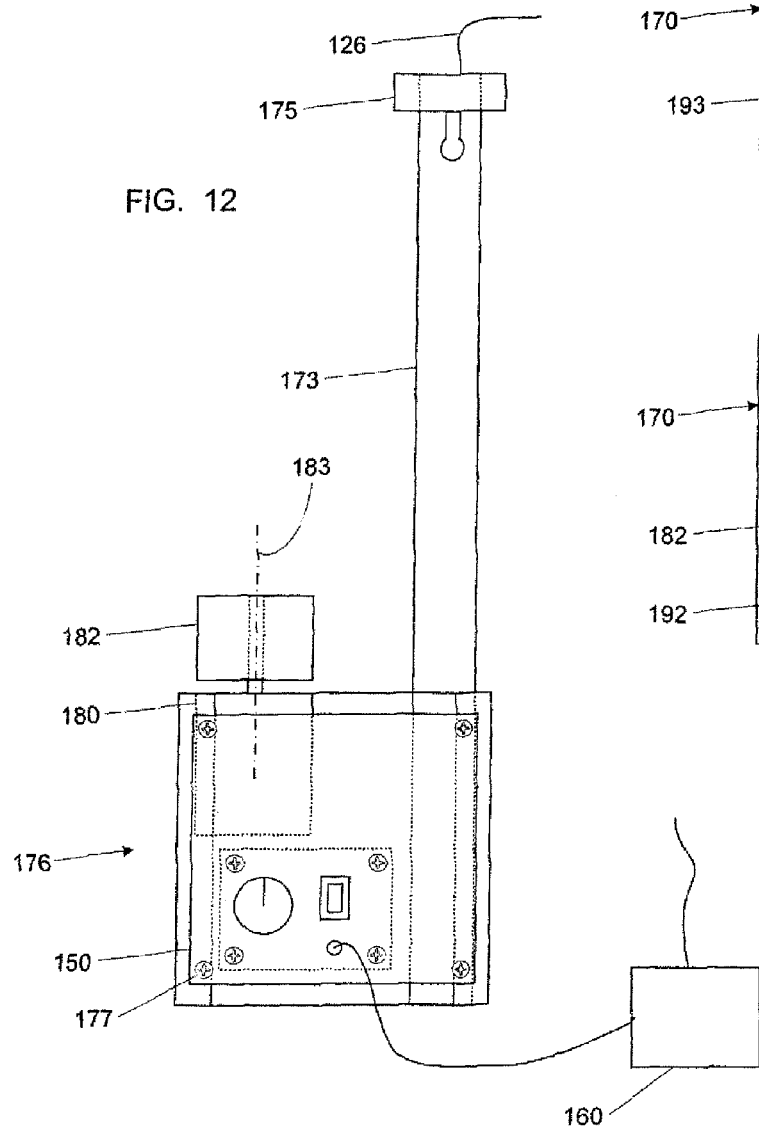
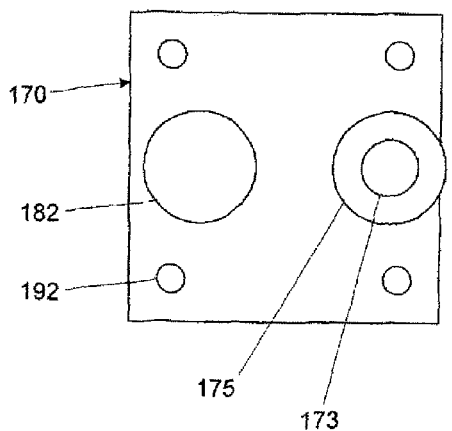

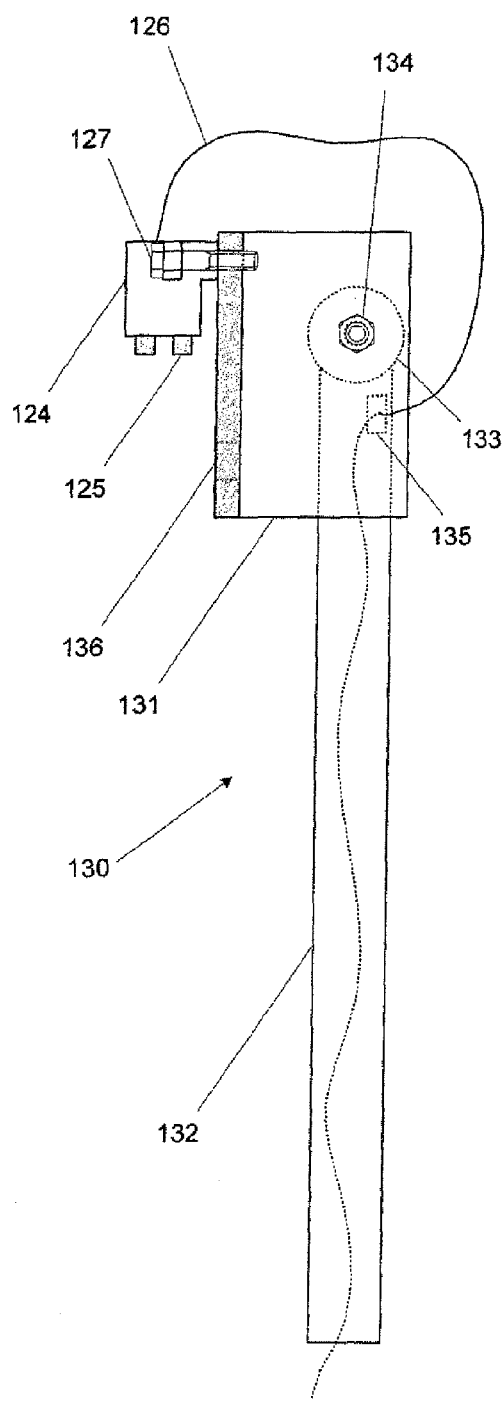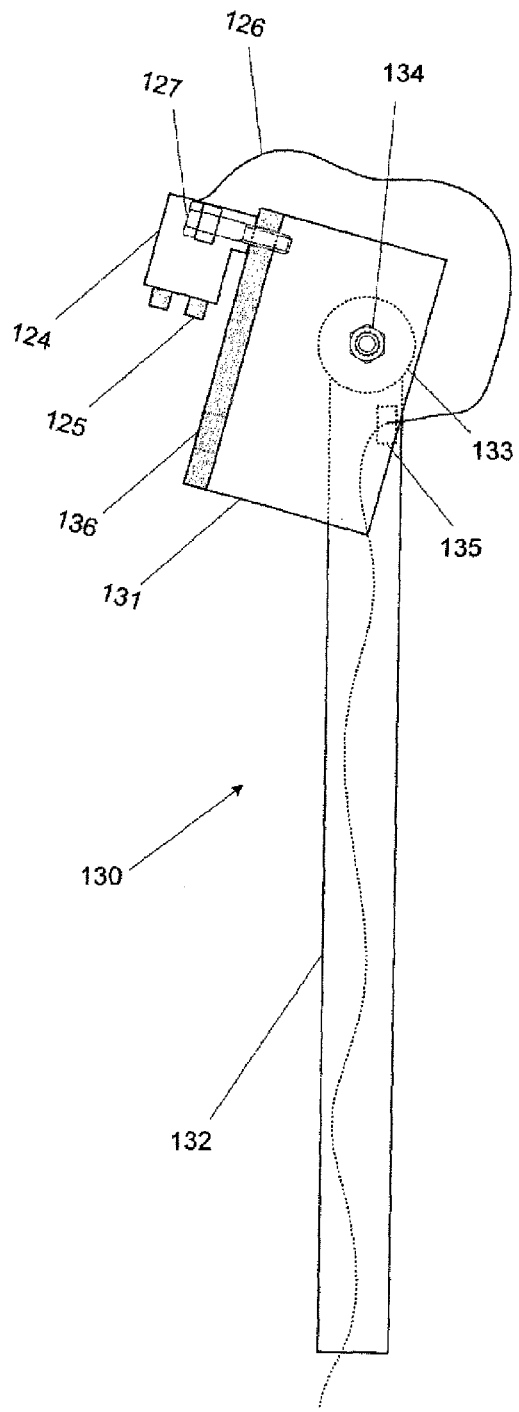

BICYCLE WHEEL SPINNER STAND FOR RETAIL DISPLAY

CROSS-REFERENCE TO RELATED APPLICATIONS

Not Applicable

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention generally relates to retail display systems and, more particularly, to retail display systems having stands for spinning wheels and powering light devices attached to the spinning wheels.

BACKGROUND OF THE INVENTION

A persistence-of-vision (POV) light device creates a visual display when the light device is spinning such as when attached to a spinning bicycle wheel. For example, see U.S. Patent Application Publications US 2011/0038169 A1 and US 2012/0200401, the disclosures of which are expressly incorporated herein in their entireties by reference. In order to create the visual display, the wheel with the attached POV light device is rotated and the POV light device is supplied electrical power. When the wheel is on a bicycle, the rotation of the bicycle wheel is provided by pedaling the bicycle and the electrical power is typically provided by a battery mounted to the POV light device or the bicycle wheel.

In retail stores it is often desired to demonstrate or animate a product. Rotating displays have been used to demonstrate products since at least 1900. U.S. Pat. No. 1,927,283 to Hernandez describes a rotating display for confections. This device must be rotated manually.

U.S. Pat. No. 1,886,549 to Howell describes a motorized display for a an automobile or car tire. The Howell device is designed for rotating the car tire without an attached wheel. The device includes a central adjustable mechanism for grasping the tire. No means is provided for attaching a tire mounted to a wheel. The Howell device is floor-standing and comparatively large and heavy. The large size makes it unsuitable for use in a small shop or crowded shop window, as well as comparatively expensive to transport. The Howell device includes a spring mechanism to maintain contact between a treaded portion of the tire and a motor for spinning the tire. The tire is maintained in a fixed position about a rotating axis while the motor can move to maintain contact with the tire. Such a mechanism is only suitable for low speed operation because treads on the tire cause the motor to bounce and vibrate excessively at higher speeds. Contacting the treaded portion of the tire also creates noise during operation which is undesirable in a retail store.

U.S. Pat. No. 3,843,000 to Bennett describes a device for supporting and rotating a car tire while being painted. The device includes a motorized spinning device for an automobile or car wheel with a mounted tire. The wheel is not held in a way which permits rapid rotation, and the wheel is not held sufficiently securely to permit continuous unattended operation.

U.S. Pat. No. 3,611,601 to Stropkay describes a device which simulates rotation of an automobile or car tire but does not actually rotate the tire. A simulated wheel part is provided and rotated within the tire. The device includes a non-moving light located behind the simulated wheel part.

At least one company has produced a display stand that utilizes POV technology with a bicycle wheel. Anvii Corporation Ltd. of Taiwan markets a display stand under the commercial name "Ferris Wheel" that spins a bicycle wheel with lights mounted thereon. This display stand may be considered a significant advancement over the previous display devices, but significant drawbacks remain. These drawbacks include: the display stand can only accommodate a single size of bicycle wheel; the display stand blocks visibility of about 16% of the area inside the wheel rim from one side, so a viewer can only see an unobstructed view of the wheel from one side rather than both sides of the wheel; installation of the wheel with proper tension is difficult and a proper tension will not be maintained as the wheel and a drive wheel wear; a slip ring with a single contact is utilized to provide power through a wheel axle and bearings acting as a second contact but is very unreliable because the axle and bearing surfaces oxidize and are not in constant contact; and the display stand can only be utilized resting on a horizontal tabletop or the like.

Accordingly, there is a need for a retail display system and method that includes a motorized spinner stand which rotates a bicycle wheel unattached to a bicycle and optionally provides electrical power to electrical devices attached to the bicycle wheel. Such a display system and method should be compact, able to mount against a variety of surfaces in a fixed location such as a store window, and be capable of operating continuously and quietly at a speed suitable for a Persistence-of-Vision light display.

SUMMARY OF THE INVENTION

Disclosed herein are retail display systems and methods which overcome at least one of the deficiencies of the prior art. Disclosed is a stand device for rotatably supporting a bicycle wheel rotatable about an axle and a lighting device secured to the bicycle wheel for rotation with the bicycle wheel. The stand device comprises an attachment location where the axle of the bicycle wheel is attached to support the bicycle wheel so that the bicycle wheel can rotate relative to the stand device. The stand device further includes a drive roller for engaging the bicycle wheel to rotate the bicycle wheel and a motor rotating the drive roller. A distance between the attachment location and the drive roller is adjustable so that the stand device accommodates different sizes of the bicycle wheel.

Also disclosed is a stand device for rotatably supporting a bicycle wheel rotatable about an axle and a lighting device secured to the bicycle wheel for rotation with the bicycle wheel. The stand device comprises an attachment location where the axle of the bicycle wheel is attached to support the bicycle wheel so that the bicycle wheel can rotate relative to the stand device. The stand device further includes a drive roller for engaging the bicycle wheel to rotate the bicycle wheel and a motor rotating the drive roller. The motor and the drive roller are secured to the stand device at a fixed location and the attachment location for the bicycle wheel is located on a pivoting portion of the stand device so that gravity pivots the bicycle wheel in a direction to engage the bicycle wheel with the drive roller and maintains force between them.

Also disclosed is a stand device for rotatably supporting a bicycle wheel rotatable about an axle and a lighting device secured to the bicycle wheel for rotation with the bicycle wheel. The stand device comprising an attachment location where the axle of the bicycle wheel is attached to support the bicycle wheel so that the bicycle wheel can rotate relative to the stand device. The stand device further includes a drive roller for engaging the bicycle wheel to rotate the bicycle wheel and a motor rotating the drive roller. The stand device also includes a base box supporting the bicycle wheel and having a substantially horizontal bottom wall, a substantially vertical rear wall, a plurality of fastener openings in the rear wall for attachment of the base box to a substantially vertical support surface, and a plurality of fastener openings in the bottom wall for attachment of the base box to a substantially horizontal support surface.

From the foregoing disclosure and the following more detailed description of various preferred embodiments it will be apparent to those skilled in the art that the present invention provides a significant advance in the technology and art of retail display systems and methods. Particularly significant in this regard is the potential the invention affords for providing a spinner stand that is compact, easy to install in a variety of different types fixed locations, operable continuously and reliably, and relatively simple in design. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 12 a left-side elevational view of a base assembly of the stand device of FIGS. 5 to 8.

FIG. 13 is bottom plan view of the base assembly of FIG. 12.

FIG. 14 is bottom plan view of the base assembly of FIG. 12.

FIG. 17 is an enlarged left-side elevational view of a head assembly of the stand device of FIGS. 5 to 8.

FIG. 18 is left-side elevational view similar to FIG. 17 but wherein a head bracket is pivoted.

Figure 1:
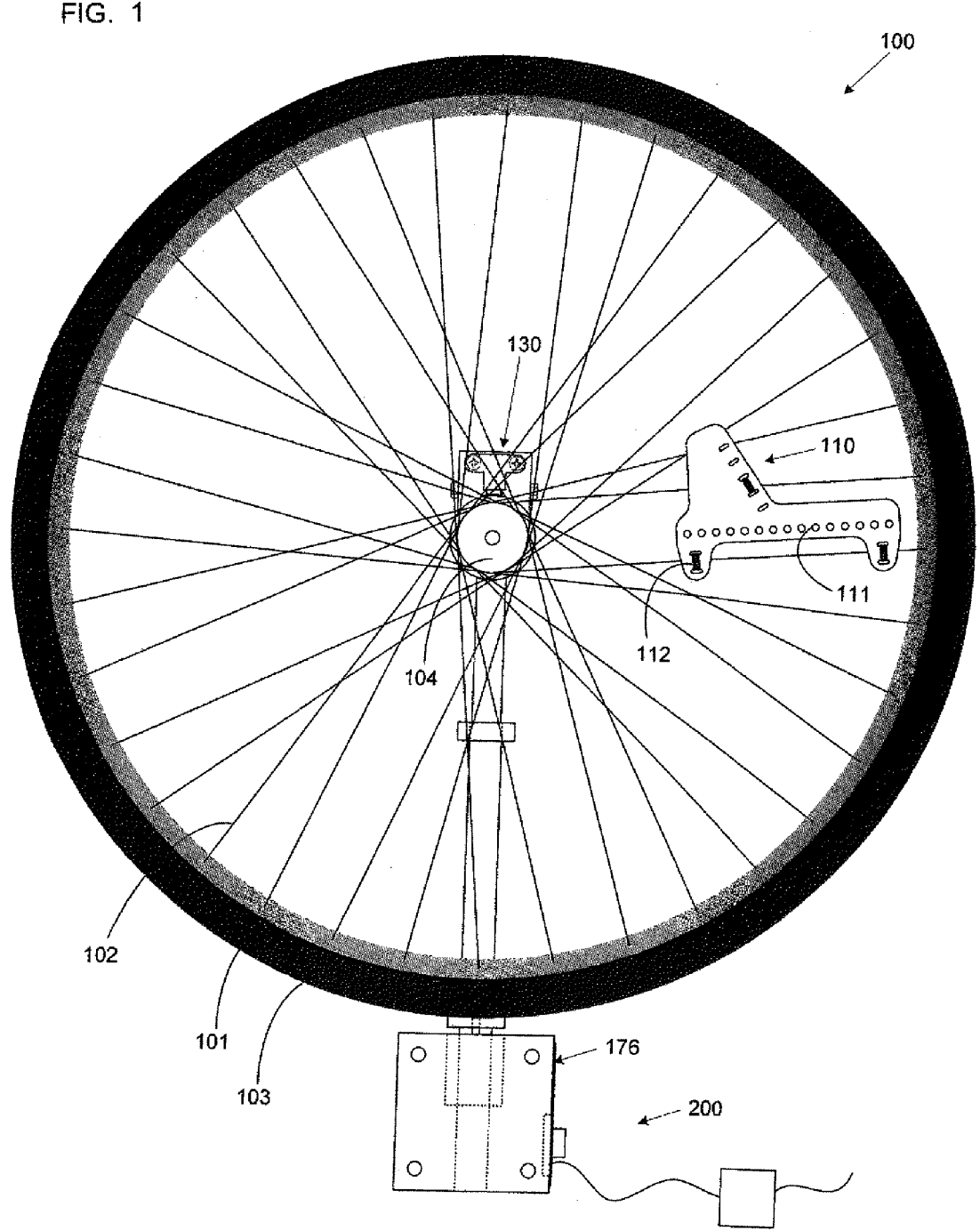
FIG. 1 is a front elevational view of a display system including a powered stand device for spinning a bicycle wheel mounted thereon and powering a lighting device mounted on the bicycle wheel according to the present invention.
Figure 2:
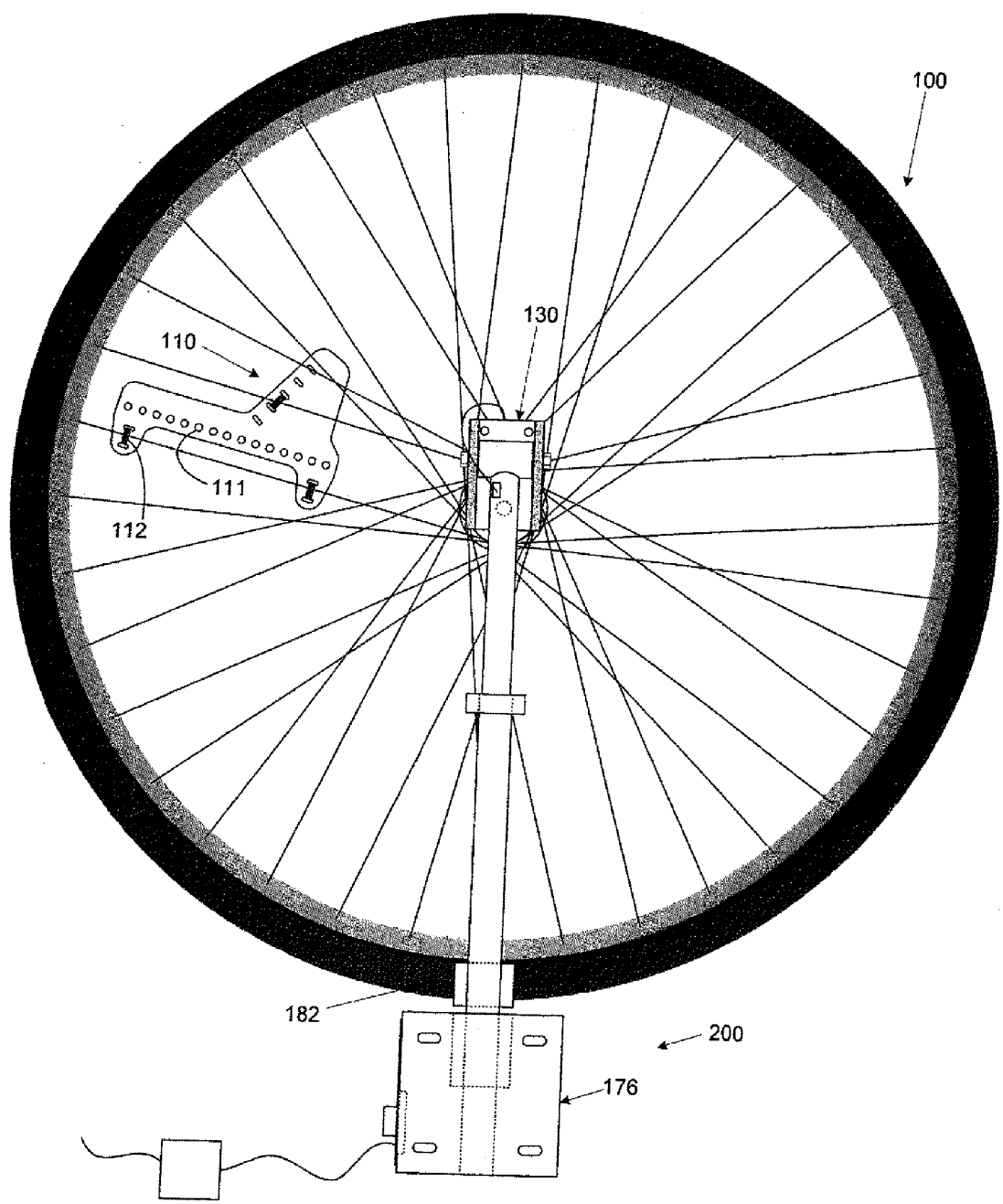
FIG. 2 is a rear elevational view of the display system of FIG. 1.
Figure 3:
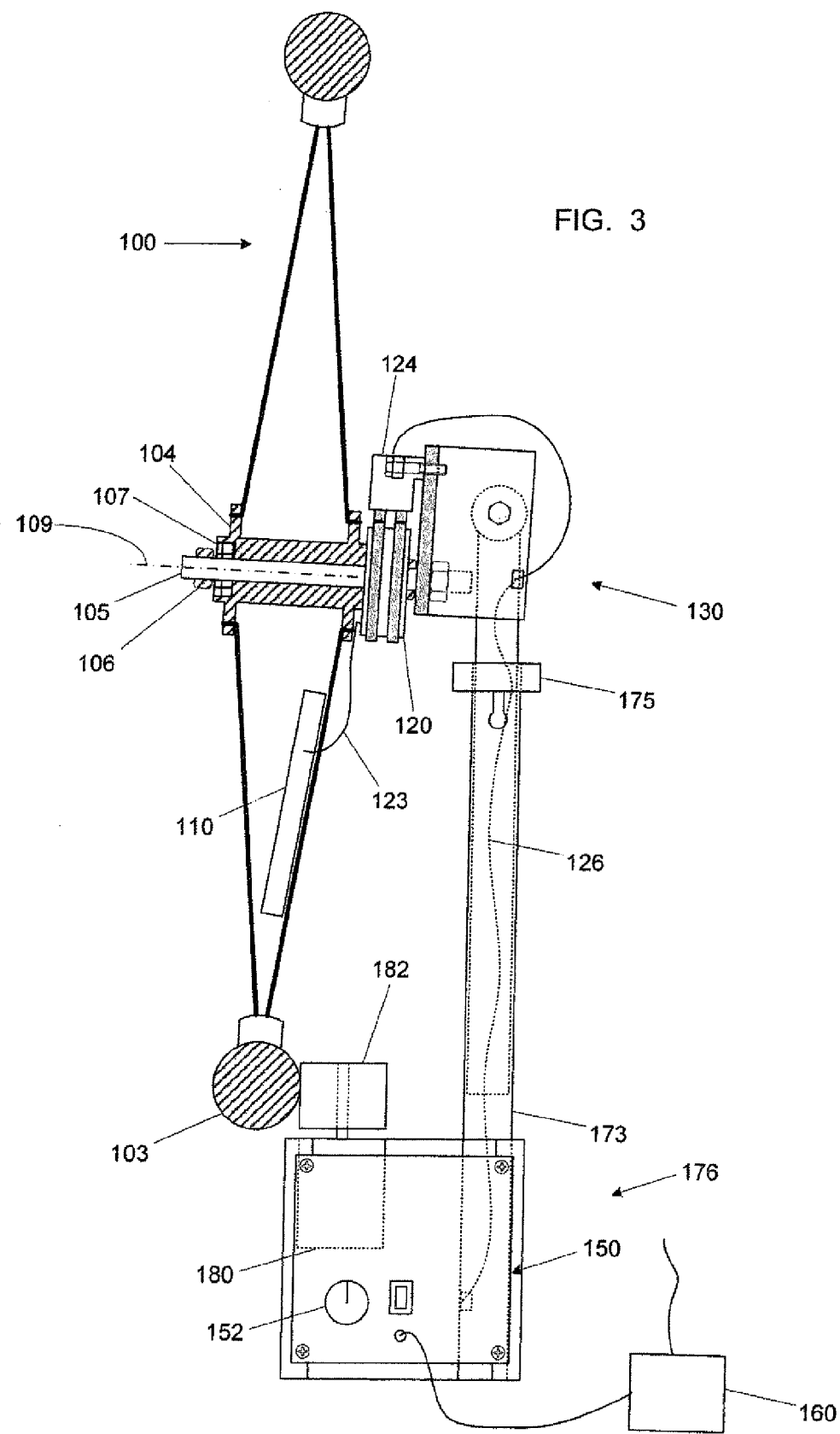
FIG. 3 is a left-side elevational view, partially in cross-section, of the display system of FIGS. 1 and 2.

It should be understood that the appended drawings are not necessarily to scale, presenting a somewhat simplified representation of various preferred features illustrative of the basic principles of the invention. The specific design features of the retail display system as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the display systems illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved display systems and methods disclosed herein. The following detailed discussion of various alternative and preferred embodiments will illustrate the general principles of the invention. Other embodiments suitable for other applications will be apparent to those skilled in the art given the benefit of this disclosure.

Referring now to the drawings, FIGS. 1 to 3 and 26 show a display system according to the present invention that can be utilized in a retail environment or any other suitable environment where it is desired to utilize lighting to display a message and/or otherwise attract attention. The illustrated display system includes a powered stand device 200, a wheel 100 supported by and rotated by the stand device 200, and a lighting device 110 secured to and rotatable with the wheel 100 to provide a lighting display. In the illustrated embodiment, the stand device 200 rotates the wheel 100 and supplies electrical power to the lighting device 110.

The illustrated wheel 100 is a common, off-the-shelf, bicycle wheel but can alternatively be any other suitable type of wheel or other rotating member. The illustrated off-the-shelf bicycle wheel 100 includes a rim 101 supporting a tire 103, a central hub 104, and a plurality of spokes 102 extending from the hub 104 to the rim 101 for supporting the rim 101 about the hub 104. An axle 105 extends through a central opening in the hub 104 to form an axis of rotation 109 for the wheel 100. The illustrated axle 105 has externally threaded ends which receive axle nuts 106 thereon for securing the axle 105. Axle bearings 107 are provided between the axle 105 and the hub 104 at opposed axial sides of the hub 104 for reducing friction between the hub 104 and the axle 105 as the hub 104 rotates about the axle 105. A rear side of the hub 104 is provided with an external gear mating surface 108 (best shown in FIGS. 10 and 11) extending about axle 105 as will be described in more detail hereinafter.

The illustrated lighting device 110 is a persistence of vision (POV) lighting device or unit as disclosed in U.S. patent application Ser. No. 12/478,823, the disclosure of which is expressly incorporated herein in its entirety by reference. Such a lighting device 110 is available from MonkeyLectric LLC. It is noted however that any other suitable lighting device 110 can alternatively be utilized. The illustrated lighting device 110 includes a support body or mounting structure, a row or linear array of lights 111 secured to the body, electronic controls or circuitry secured to the body and operably connected to the lights 111 for activating the lights 111 in a desired manner, and a plurality of attachment points or mounts to secure the body to the wheel 100. The illustrated row of lights 111 has fifteen of the lights 111 but any other suitable number of lights 111 can be utilized. The lights 111 can be full color, wide angle, ultra-bright LEDs but any other suitable type of LED or any other suitable type of light can alternatively be utilized.

The illustrated lighting device 110 is secured to the spokes 102 of the wheel 100 with mounting straps 112 such that the row of lights 111 extends in a radial direction of the wheel 100 between the hub 104 and the rim 101. The mounting straps 112 can be Nylon tie straps or any other suitable means of securing the lighting device 110 to the spokes 102. The illustrated row of lights 111 is oriented to face perpendicularly outward from the wheel 100 substantially parallel to the axis of rotation 109 of the bicycle wheel 100 to be visible from one lateral side of the bicycle wheel 100 and the front of the display system. The illustrated lighting device 110 also includes another or a second row or array of lights 111 which is located on the opposite side of the body directly behind the first row of lights 11 so that the second row of lights 111 is oriented in the opposite direction and is visible from the other lateral side of the bicycle wheel 100. With the two rows of lights 111 oriented in this manner, the lights provide nearly 360 degree visibility about the wheel. It is noted that a single row of lights 111 can alternatively be utilized that can be viewed from one or both sides of the bicycle wheel. It is also noted that more than two rows of lights 111 or other configurations of lights 111 can alternatively be utilized.

Figure 4:
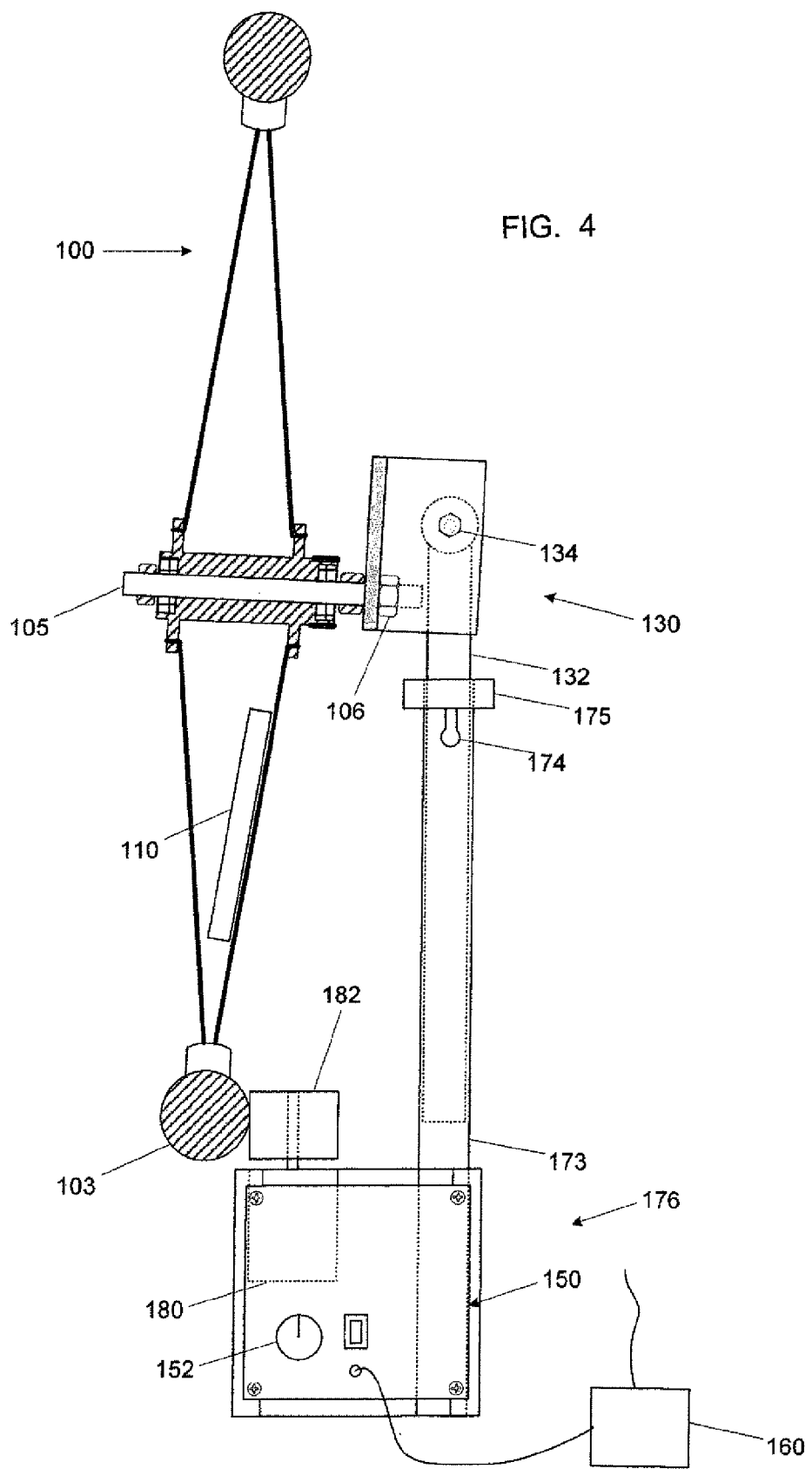
FIG. 4 is a left-side elevational view of a display system according to an alternative embodiment of the present invention, wherein the stand device does not transfer electrical power to the lighting device mounted on the bicycle wheel.
Figure 5:
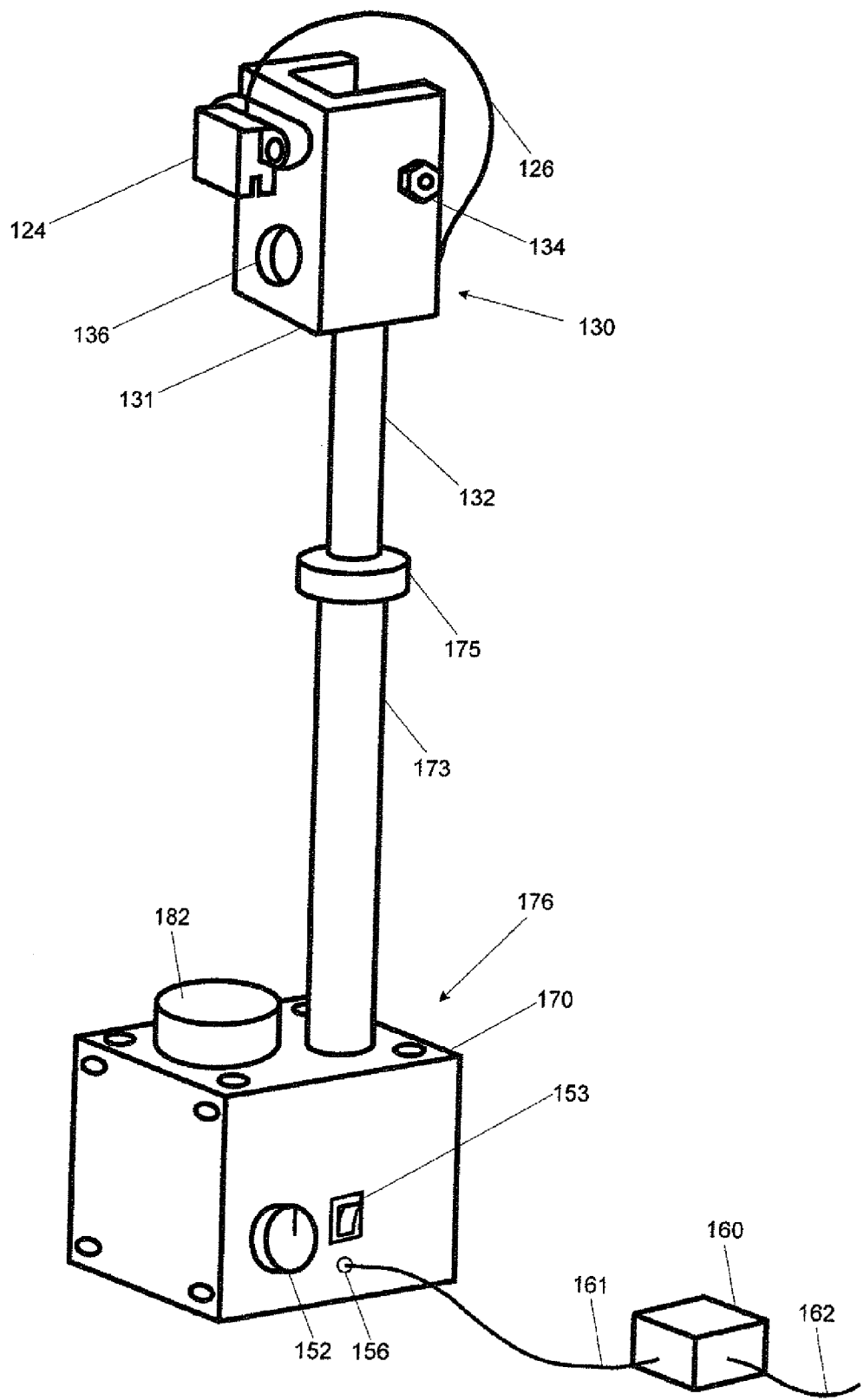
FIG. 5 is a perspective view of the stand device of the display system of FIGS. 1 to 3.

FIG. 4 illustrates a display system according to a second embodiment of the present invention which is substantially the same as the first embodiment described herein except that, while the stand device 200 rotates the wheel 100, the stand does not supply electrical power to the lighting device 110. In this second embodiment of the present invention, the lighting device 110 must have a source of electrical power such as a battery or batteries integrated therewith or secured to the wheel 100 and electrically connected to the lighting device 110. A suitable universal battery holder is disclosed in U.S. patent application Ser. No. 13/218,730, the disclosure of which is expressly incorporated herein in its entirety by reference. Such a universal battery holder is available from MonkeyLectric LLC.

As best shown in FIGS. 5 to 8, the stand device 200 includes an AC/DC power converter 160 for supplying DC power to the stand device 200, a slip ring 120 for transferring electrical power from the stand device 200 to the lighting device 110 mounted on the rotating wheel 100, a head assembly 130 for mounting the bicycle wheel 100 to the stand device 200, and a base assembly 176 for supporting the head assembly 130 with the bicycle wheel 100 rotatably secured thereto. The illustrated head assembly includes a head bracket 131 secured to the top of a head or upper tube 132. The illustrated upper tube is received in a base or lower tube 173 of the base assembly 176 in a telescoping manner so that they operate as an adjustable length tube and the total length of the combination of the upper and lower tubes 132, 173 can be selectively adjusted. The illustrated lower tube 173 is provided with a locking collar 175 and a keyhole slot 174 which together can selectively lock and unlock the position of the upper tube 132 relative to the lower tube 173 by rotation thereof. This method of providing a locking, adjustable length tube is well know in the art. It is noted that any other suitable type of lock can be provided between the upper and lower tubes 132, 173. The illustrated upper and lower tubes 132, 173 are circular in cross-section but any other suitable shape of tubes can alternatively be utilized. It is also noted that the telescoping tubes 132, 173 can alternatively be any other suitable type of adjustable length tube.

Figure 6:
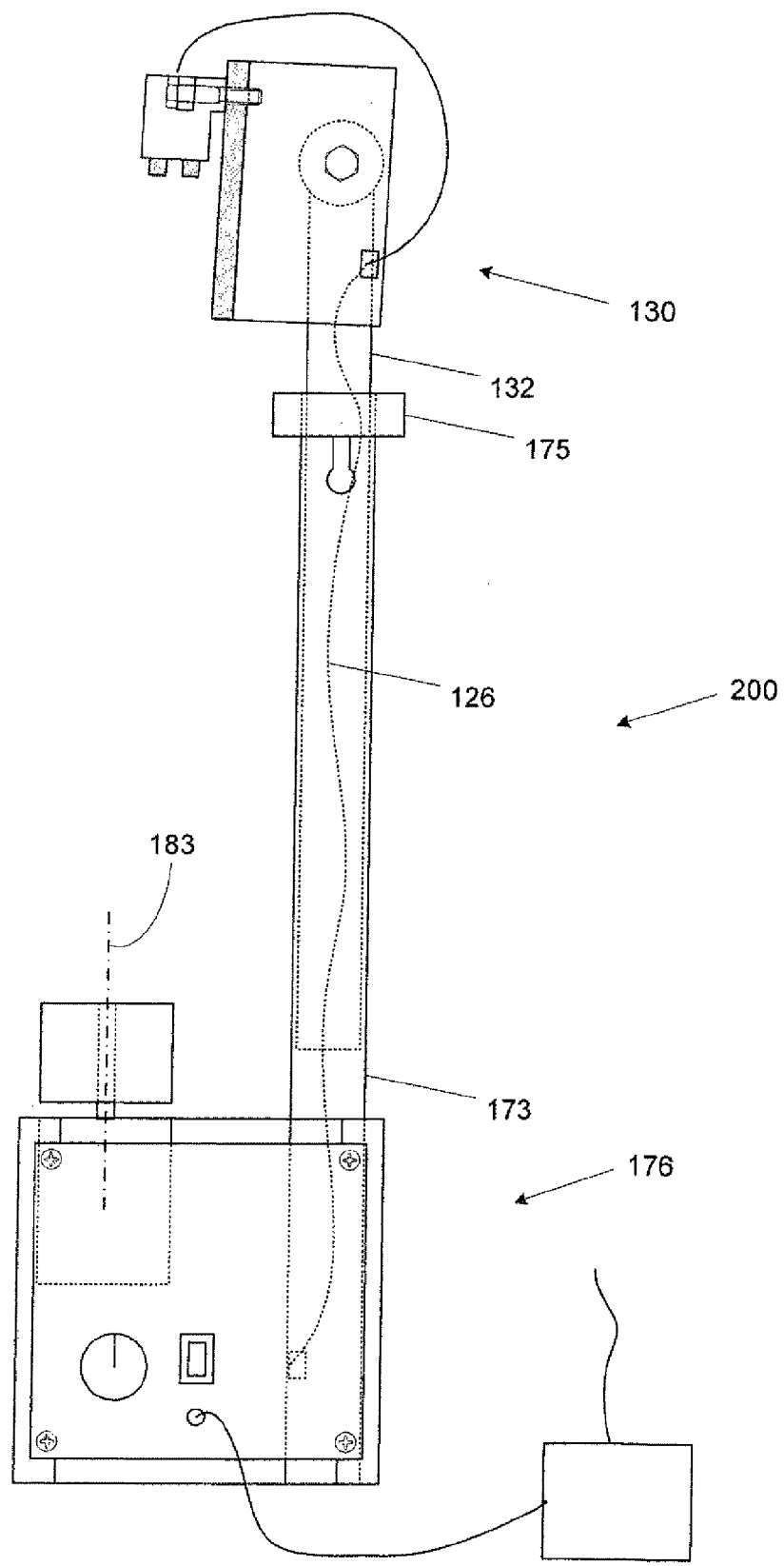
FIG. 6 is a left-side elevational view of the stand device of FIG. 5.
Figure 7:
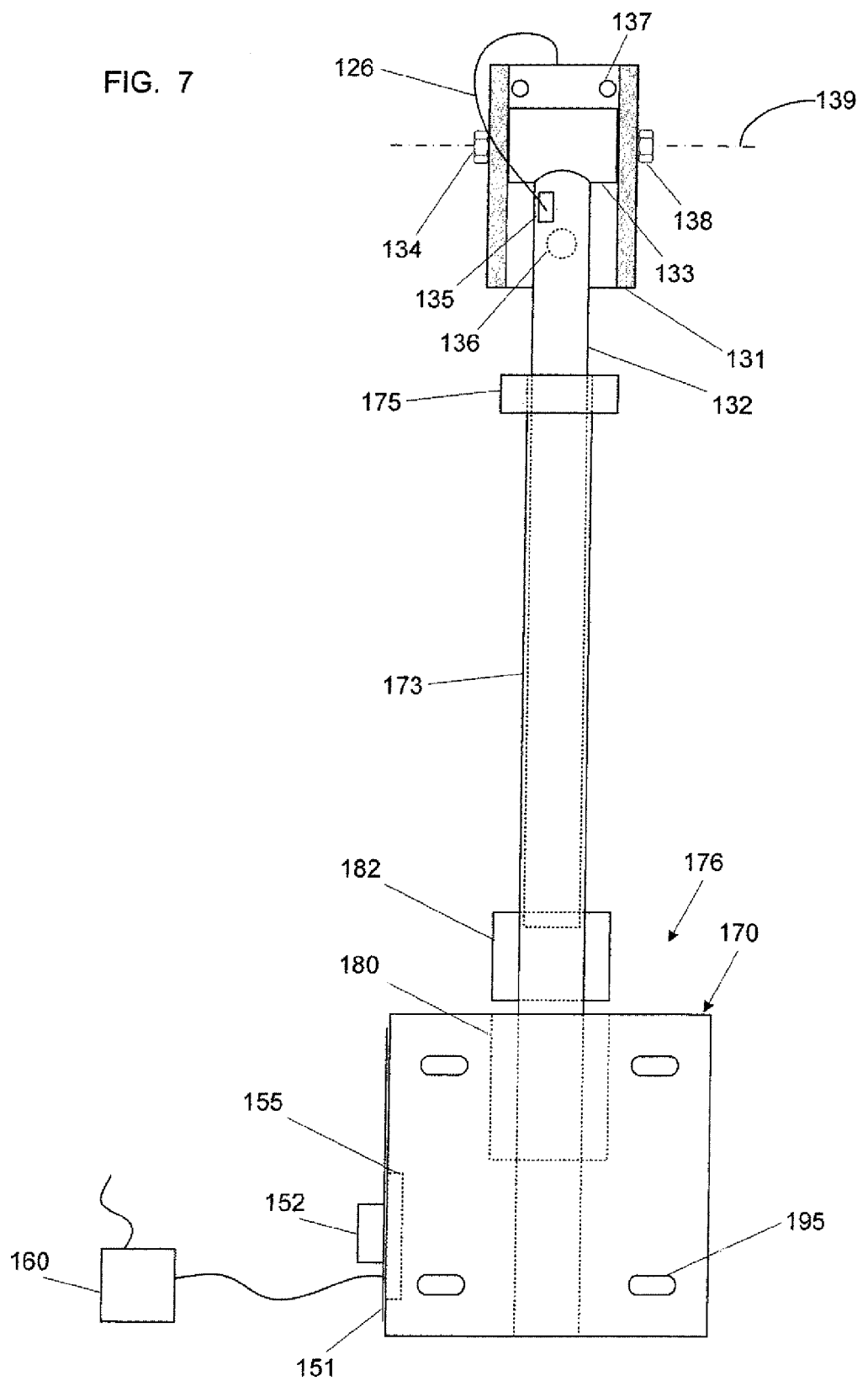
FIG. 7 is rear elevational view of the stand device of FIGS. 5 and 6.
Figure 8:
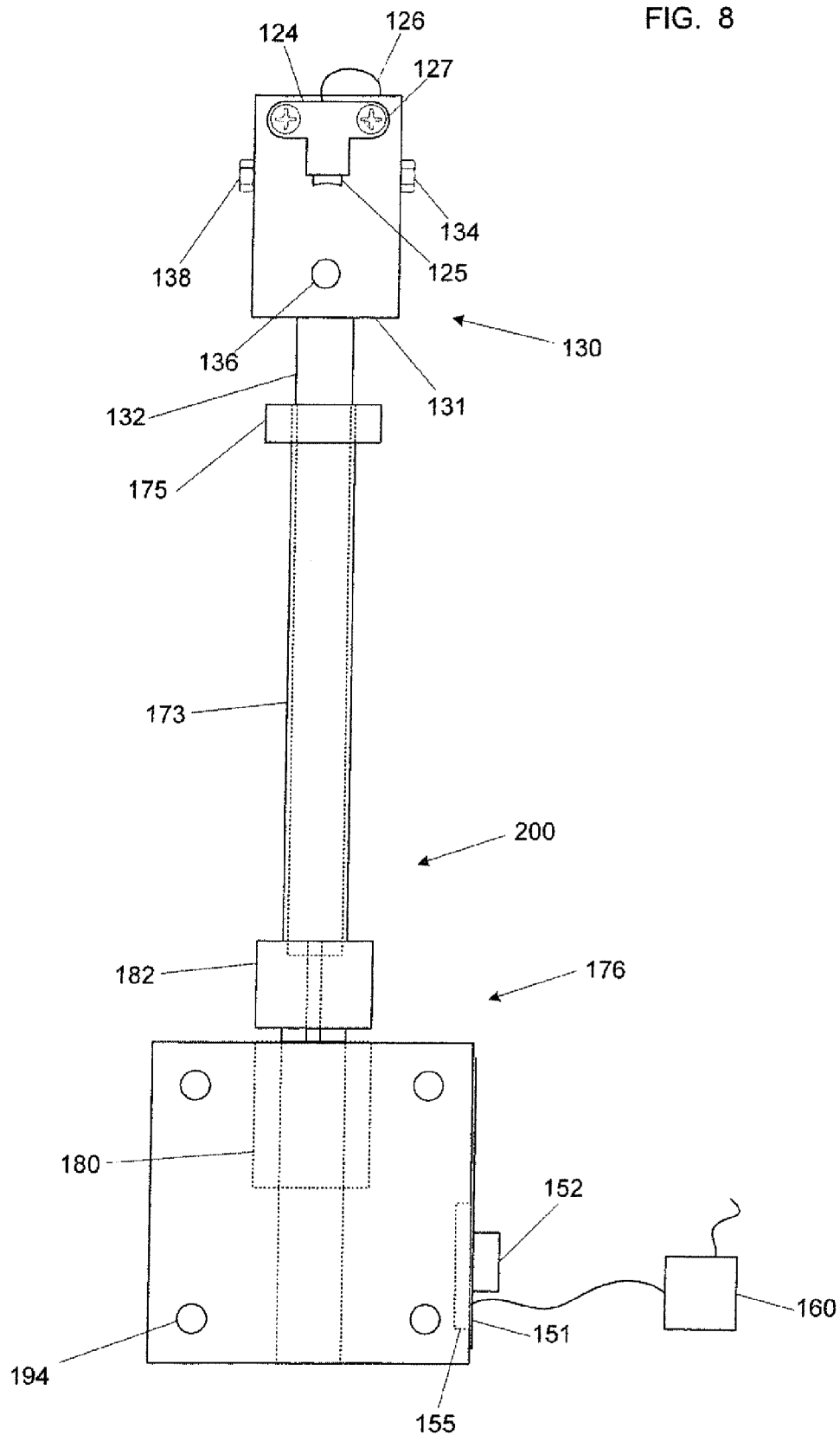
FIG. 8 is a front elevational view of the stand device of FIGS. 5 to 7.
Figure 9:
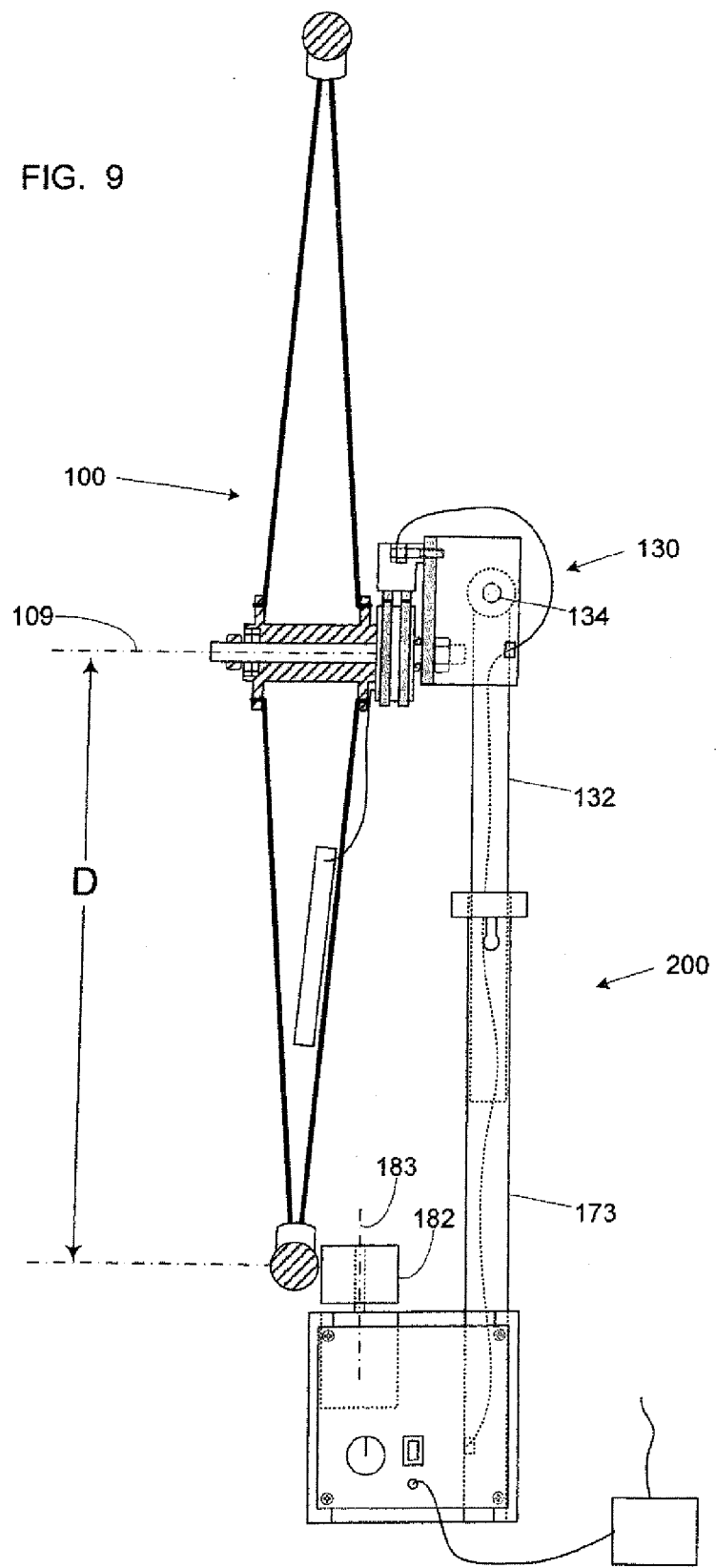
FIG. 9 is left-side elevational view similar to FIG. 3 but wherein a bicycle wheel having a larger diameter is secured to the stand device.

Configured in this manner, the illustrated stand device 200 can be utilized with a wide variety of different sized bicycle wheels 100 because the distance D (perpendicular to the axis of rotation 109 of the bicycle wheel 100) between an axle mounting location 136 for the bicycle wheel 100 on the head assembly 130 and a drive roller 182 of the base assembly 176 that engages and drives the bicycle wheel 100 to rotate the bicycle wheel 100 can be adjusted to match a size of the attached bicycle wheel 100 by adjusting the upper and lower tubes 132, 173 relative to one another. The illustrated distance D is also the distance between the axle 105 of the bicycle wheel 100 and the drive roller 182. FIGS. 6 and 9 show two different sizes of bicycle wheels 100 interchangeably secured to the same stand device 200 wherein the upper tube 132 is extended further from the lower tube 173 for the larger bicycle wheel 100 (see FIG. 9) than for the smaller bicycle wheel 100 (see FIG. 3) so that the drive roller 182 engages the side of the tire 103 of the bicycle wheel 100 regardless of the size of the bicycle wheel 100 secured to the head assembly 130. The stand device 200 is preferably configured to allow mounting of a range of common bicycle wheels 100 such as, for example 20 inches to 29 inches. It is noted that any other suitable range of sizes can alternatively be utilized. It is also noted that the stand device 200 can be alternatively configured in any other suitable manner in order to accommodate different sizes of bicycle wheels 100 such as, for example, the drive roller 182 can be raised and lowered rather than or in addition to raising and lowering the attachment location 136 for the bicycle wheel 100.

Figure 25:
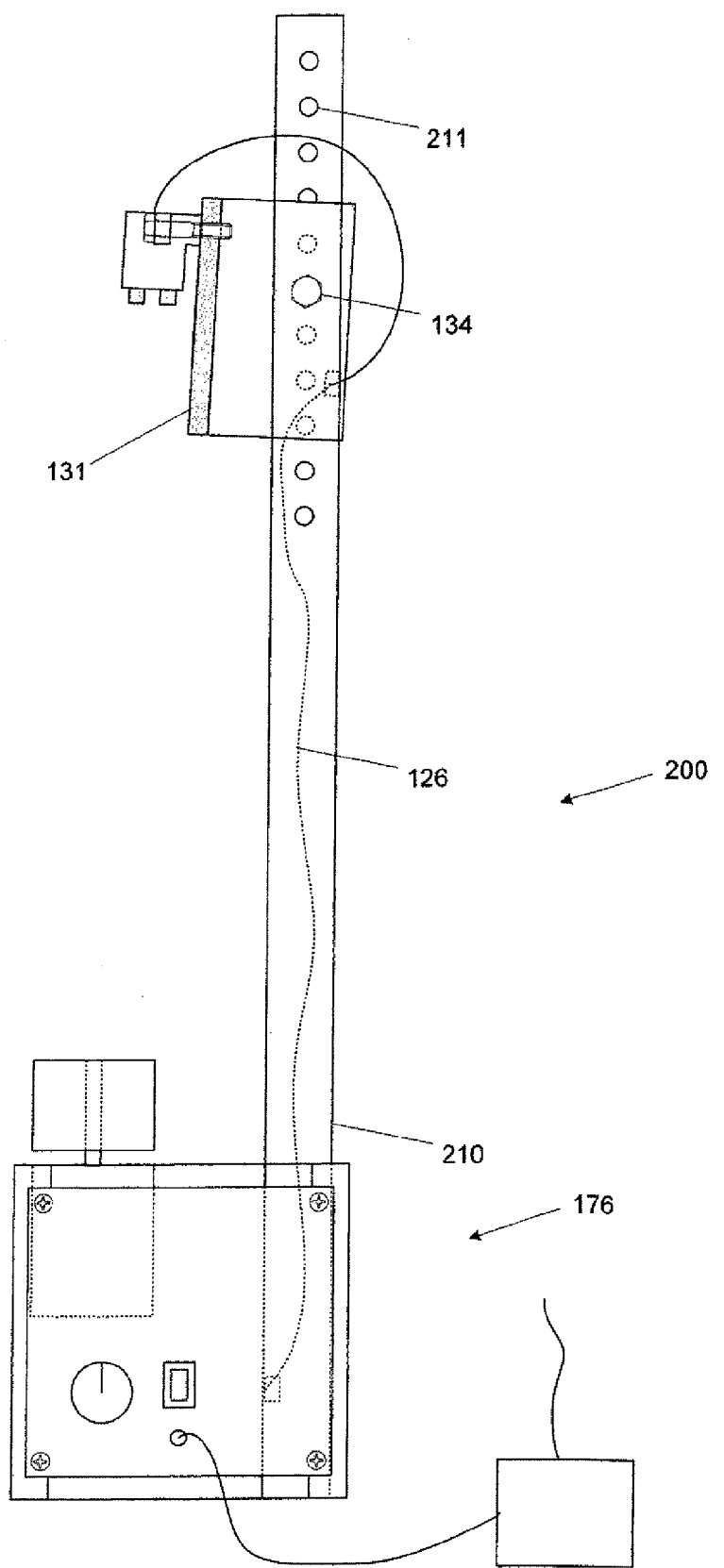
FIG. 25 is a left-side elevational view similar to FIG. 6 but showing a stand device according to an alternative embodiment wherein a head bracket for mounting the bicycle wheel is adjustable along a base tube rather than having an adjustable length tube.
Figure 26:
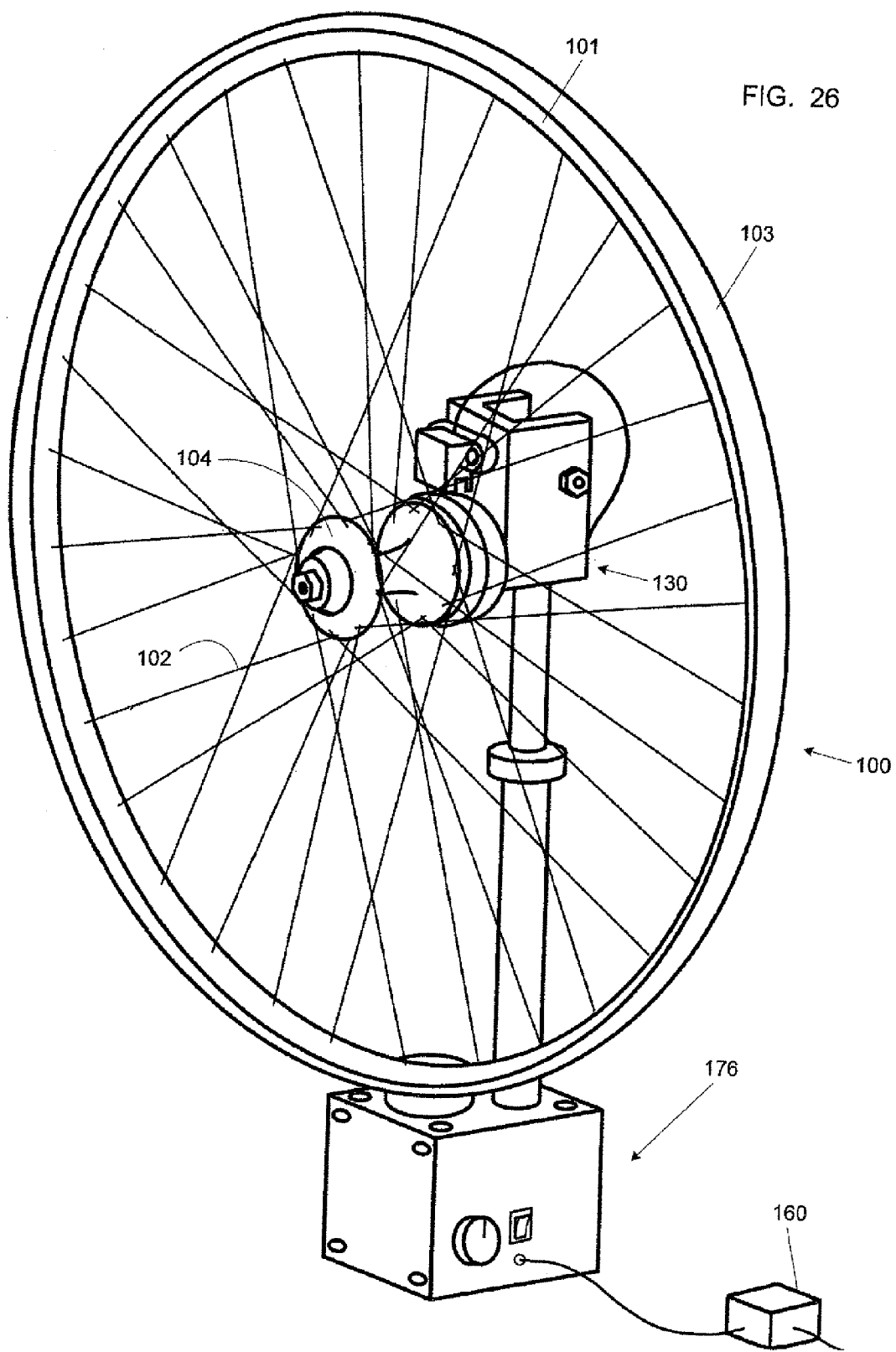
FIG. 26 is a perspective view of the display system of FIGS. 1 to 3, wherein the lighting device is omitted for clarity.

FIG. 25 illustrates an alternative embodiment of the stand device 200 wherein the distance D is adjusted by moving the mounting and pivoting location of the head bracket 131 along the height of a base tube 210 rather than having the adjustable length tube 132, 173. The illustrated stand device 200 has a single rectangular profile base tube 210 with a plurality of vertically spaced apart mounting holes 211 for the head bracket 131. No head tube 132 is used in this illustrated embodiment but the plurality of mounting holes 211n could be used in combination with an adjustable length tube 132, 173 if desired. The unmodified head bracket 131 is removably bolted to the base tube 210 using any one of the mounting holes 211. Thus the mounting holes 211 provide the adjustment for any size of bicycle wheel 100. It is noted that any other suitable method of adjusting distance D can alternatively be utilized.

Figure 10:
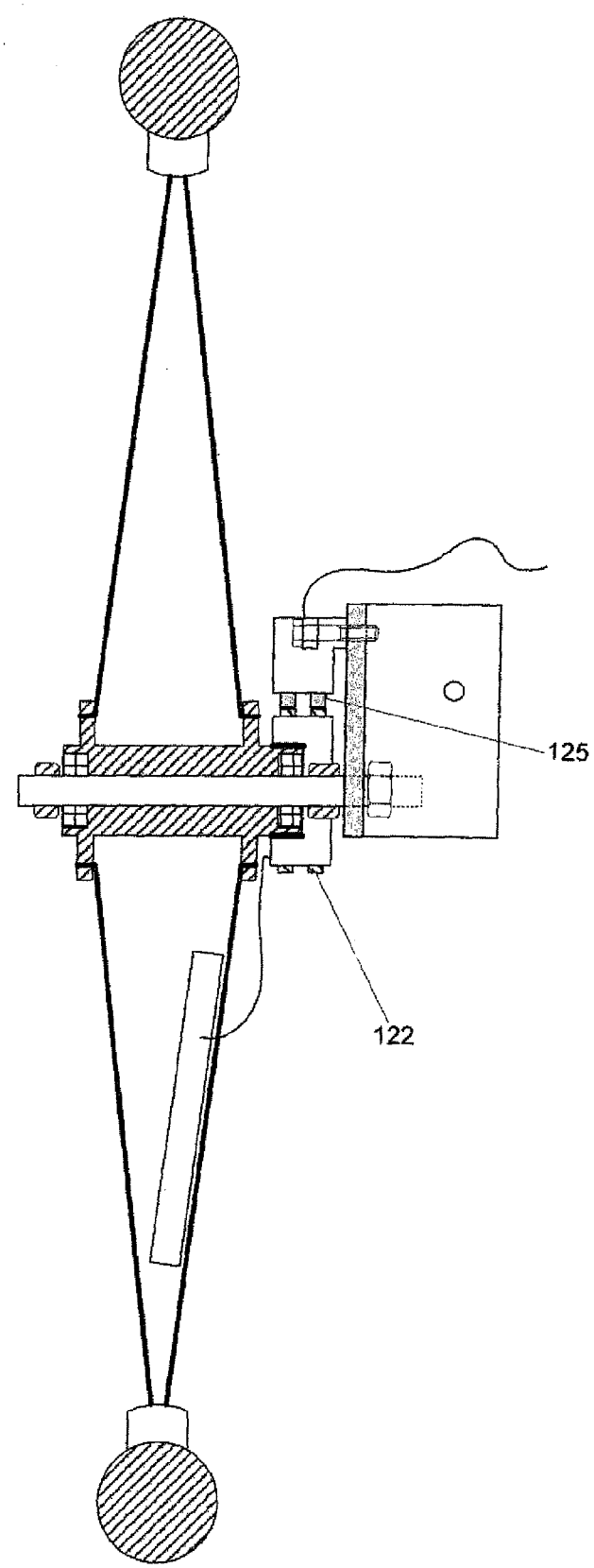
FIG. 10 is an enlarged left-side elevational view of a portion of the display system of FIGS. 1 to 3 showing an interface between the stand device and bicycle wheel and the stand device and the lighting device.
Figure 11:
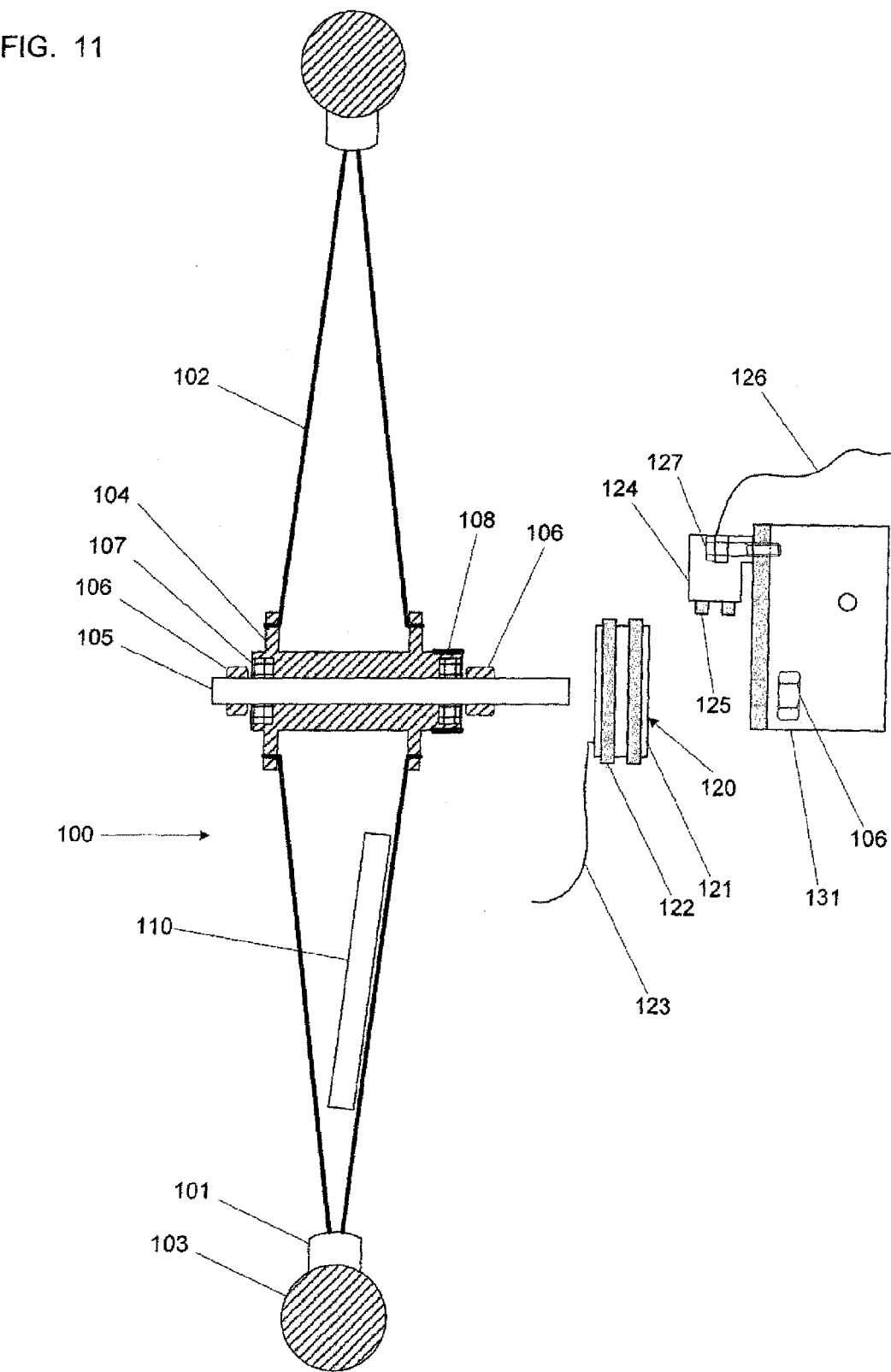
FIG. 11 is a left-side elevational view similar to FIG. 4. but partially exploded.
Figure 15:
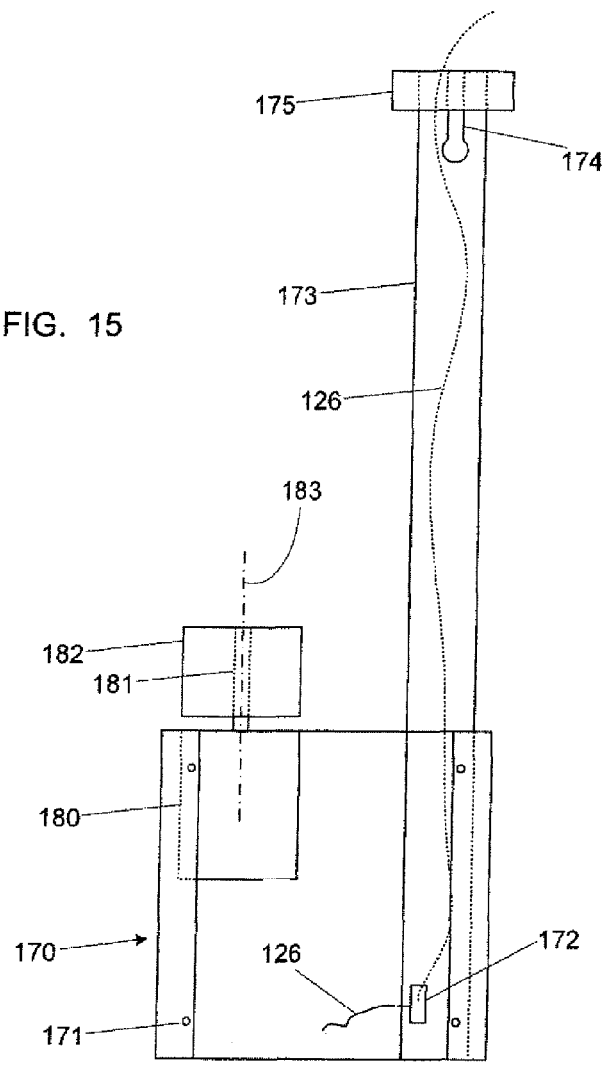
FIG. 15 is a left-side elevational view of the base assembly of FIG. 12 but wherein a control panel assembly is removed for clarity.

FIGS. 10 and 11 illustrate the mechanical connection between the stand device 200 and the bicycle wheel 100 for supporting the bicycle wheel 100 and the electrical connection between the stand device 200 and the lighting device 110 for electrically powering the lighting device 110. The illustrated head bracket 131 is generally channel shaped having a vertically-extending and frontward-facing front wall and a pair of side walls rearwardly extending from the lateral edges of the front wall. The axle mount hole 136 is located near a lower end of the front wall and is sized and shaped to receive the axle 105 of the bicycle tire 100 therein. The axle 105 is rigidly secured to the front wall of the head bracket 131 by a pair of the axle nuts 106 threaded onto the axle 105 on opposite sides of the front wall. Secured in this manner, the axle 105 is fixed to the head bracket 131 against movement therebetween with the axle 105 forwardly extending from the front wall to support the bicycle wheel 100 from the head bracket 131 in a cantilevered manner. That is, the bicycle wheel 100 is supported by only the rear end of the axle 105. Mounted in this manner, the illustrated bicycle wheel 100 is supported only by the axle 105 secured to the stand device.

The slip ring 120 is provided at the interface of the bicycle wheel 100 and the head bracket 131 for providing electrical power to the lighting device 110 on the rotating bicycle wheel 100 to allow continuous battery-free operation of the display device in locations such as, for example, a shop window where it would be inconvenient to supply batteries. The illustrated slip ring 120 has a slip ring body 121 attached to the hub 104 of the bicycle wheel 100 at the gear mating area 108. Thus the slip ring 120 replaces the gear or gear cluster that is typically mounted to the hub 104 at this location. The illustrated slip ring 120 is a two-contact slip ring sometimes referred to as a commutator. A pair of conductive rings 122 encircle the outer surface of the body 121. A two conductor wire 123 electrically connects the lighting device 110 with the conductive rings 122 of the slip ring 120. A brush holder 127 is secured to the front wall of the head bracket 131 which has a pair of spaced-apart carbon brushes 125 positioned to contact the pair of conductive rings 122 of the slip ring 120 respectively. The illustrated brush holder 124 is secured to the head bracket 131 with a fastener 127 in the form of a bolt extending into a mounting hole 137 in the front wall of the head bracket 131 but any other suitable means of attachment can alternatively be utilized. The brushes 125 are electrically connected to power via a wire 126 that extends from the brush holder 124 to the control panel assembly 150 of the base assembly as discussed in more detail hereinafter (best shown in FIGS. 3 and 19). The illustrated wire 126 extends from the brush holder 124 and into the upper tube 132 through a wire opening 135 located near the upper end of the upper tube 132, through the interior of the upper and lower tubes 132, 173, and out of the lower tube 173 through a wire opening 172 located near a lower end of the lower tube 173 within the base box or housing 170 to the control panel assembly 150. Attached in this manner, electrical power is routed from the control panel assembly 150 to the carbon brushes 125 by the wire 126 extending through the tubes 132, 173, from the carbon brushes 125 by contact with the conductive rings 122 of the slip ring 120, and from the conductive rings 122 to the lighting device 110 by the wire 123 connecting the conductive rings 122 to the lighting device 110. It is noted that the slip ring components are well known in the art and can have any other suitable configuration and/or continuous electrical power can alternatively be provided to the lighting device 110 in any other suitable manner.

As best shown in FIGS. 12 to 16, the illustrated base assembly 176 includes a base box or housing 170, the lower tube 173 which upwardly extends from the top of the base box 170, a motor 180 located within the base box and operably connected to the drive roller 182 to rotate the drive roller 182 which upwardly extends from the top of the base box 170, and the control panel assembly 150 which is secured to the base box 170. The illustrated base box or housing 170 is generally cube shaped with each of the walls being substantially planar and is formed by sheet metal. It is noted that the base box 170 can alternatively have any other suitable shape, can alternatively comprise any other suitable material and/or, can alternatively be manufactured by any other suitable method. The illustrated base box 170 has a substantially horizontal top wall, a substantially horizontal bottom wall opposed to the top wall, a substantially vertical front wall connecting the top and bottom walls, a substantially vertical rear wall opposed to the front wall and connecting the top and bottom walls, a substantially vertical left side wall connecting the top and bottom walls and connecting the front and rear walls, and a substantially vertical right side wall opposed to the left side wall, connecting the top and bottom walls and connecting the front and rear walls. Formed in this manner, the base box has a generally hollow interior space. The illustrated right wall includes a removable face plate 151 which is secured with mounting fasteners 177 received in openings 171 so that the face plate 151 is removably secured in place so that it can be removed to provide access to the interior of the base box 170. The illustrated bottom wall is provided with a plurality of fastener openings 193 in the form of slots for attachment of the base box 170 to a substantially horizontal support surface as described in more detail hereinafter. The illustrated bottom wall also has an opening for receiving the bottom of the lower tube 173 which extends upward from the bottom wall and through an opening in the top wall. The lower tube 173 is secured to the base box 170 in any suitable manner such as, for example, welding. The illustrated top wall has a plurality of access openings 192 opposed to the plurality of fastener openings 193 in the bottom wall so that a tool can extend through the top wall to the fastener openings 193 of the bottom wall as described in more detail hereinafter. The illustrated rear wall is provided with a plurality of fastener openings 195 in the form of slots for attachment of the base box to a substantially vertical support surface as described in more detail hereinafter. The illustrated front wall has a plurality of access openings 194 opposed to the plurality of fastener openings 195 in the rear wall so that a tool can extend through the front wall to the fastener openings 195 of the rear wall as described in more detail hereinafter.

The illustrated motor 180 is a DC electric motor and is mounted within the base box 170 near the front and top walls so that a motor shaft 181 vertically extends upward therefrom through an opening on the top wall directly in front of the lower tube 173. The vertically extending motor shaft 181 forms a vertically extending axis of rotation 183 for the drive roller 182 directly secured thereto. The illustrated axis of rotation 183 of the drive roller 182 is substantially perpendicular to the axis of rotation 109 of the bicycle wheel 100. Positioned in this manner, the drive roller 182 engages a side of the bicycle wheel 100 such as at the side of the tire 103, the side of the rim 101, or any other suitable portion of the side of the bicycle wheel 100. The illustrated drive roller 182 is directly connected to the drive shaft 181 of the motor 180 but it is noted that the drive roller 182 can alternatively be connected in any other suitable manner such as, for example, through a gear connection, transmission, a belt connection, or the like. It is noted that the motor can be a variable speed motor, an AC electric motor, or any other suitable type of motor.

Figure 16:
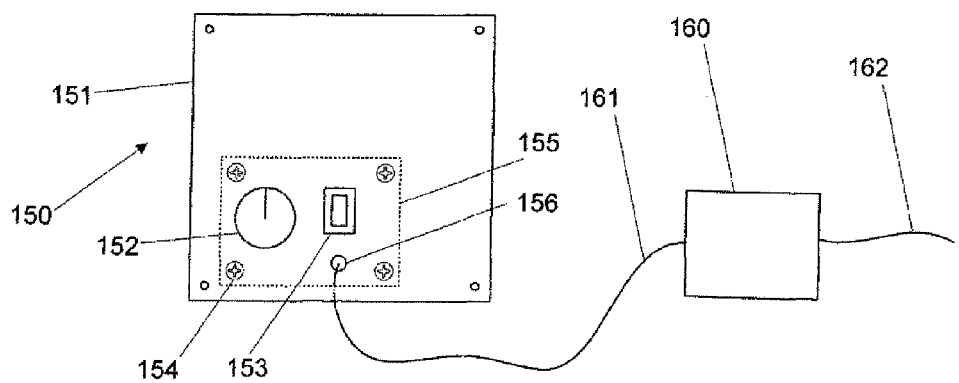
FIG. 16 is an elevational view of the control panel assembly of the base assembly of FIG. 12.

As best shown in FIG. 16, the illustrated control panel assembly 150 includes the face plate 151 removably mounted to the base box 170, a speed control knob 152 accessible from an outer side of the face plate 151, a power on/off switch 153 accessible at an outer side of the face plate 151, a controller circuit board 155 secured to an inner side of the face plate 151, a power jack 156 accessible at an outer side of the face plate 151, and a DC/DC converter 157 located on the circuit board 155. The speed control knob 152 is operably connected to the controller circuit board 155 so that the speed of the motor 180 and the drive roller 182 can be adjusted to rotate the bicycle wheel 100 at a desired speed of rotation. The power on/off switch 153 is operably connected to the controller circuit board 155 to selectively transfer power from the power source 163 to the motor 180 and the lighting device 110. The controller circuit board 155 operably connects the various electrical components as described in more detail hereinafter and is secured to an inner side of the face plate 151 with mechanical fasteners 154 so that it is located within the interior space of the base box 170. The power jack 156 is operably connected to the controller circuit board 155 and removably receives a connector of a DC power cable 161 from the AC/DC power converter 160 which is connected to the power source 163 with a wall power cable 162. The DC/DC converter 157 operably connects power to the slip ring 120 in order to provide a desired voltage to the lighting device 110. It is noted that any other suitable control circuit can be used, and for example the control circuit and/or DC/DC converter can be located outside of the base box 170 in its own separate box, or located entirely within the motor, or in any other suitable configuration.

Figure 24:
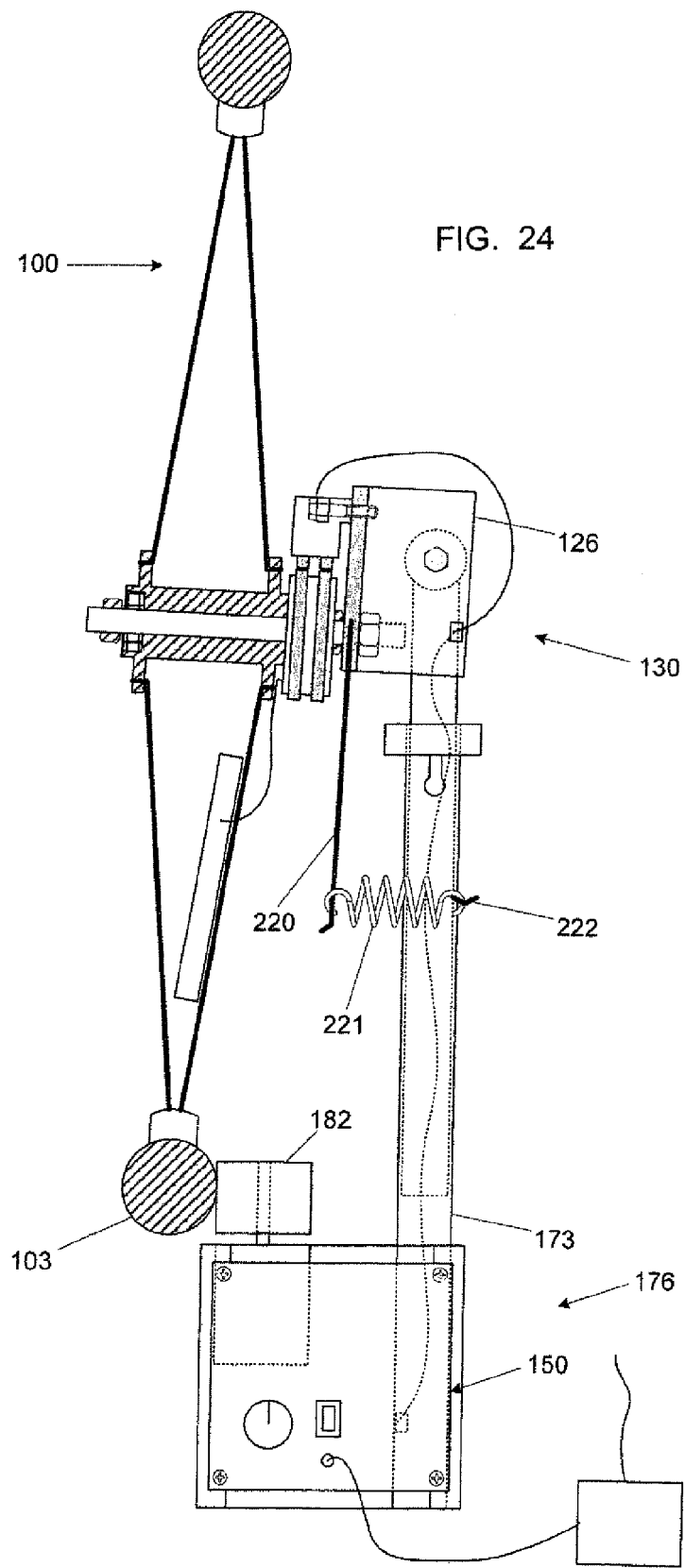
FIG. 24 is a left-side elevational view similar to FIG. 3 but showing a display system according to an alternative embodiment wherein a spring urges the bicycle wheel against the drive roller.

As best shown in FIGS. 17 and 18, the illustrated head assembly 130 includes the upper tube 132 and the head bracket 131 secured to the upper end of the upper tube 132. The illustrated head bracket 131 is pivotably secured to the upper tube 132 about a horizontal pivot axis 139 which is substantially perpendicular to the axis of rotation 109 of the bicycle wheel 100. The illustrated head bracket 131 is pivotally connected to the upper 132 tube by a pivot bolt 134 laterally extending between the parallel side walls of the head bracket 131 and through a head pivot 133 rigidly secured to the top of the upper tube 132. The pivot bolt is secured in place by a pivot nut 138. The illustrated head pivot 133 is generally tubular shaped and perpendicular to the upper tube 132. The tube pivot 133 can be secured to the upper tube 132 in any suitable manner such as, for example, welding. With the bicycle wheel 100 mounted to the pivoting head bracket 131, gravity pivots the bicycle wheel 100 downwardly in a direction toward the drive roller 182 which is mounted to the base box 170 at a fixed position to engage the side of the bicycle wheel tire 103 with the drive roller 182. A spring 221 can be provided which further urges pivoting of the bicycle wheel 100 into engagement with the drive roller 182 as shown in FIG. 24. The spring 221 is positioned so that it pivots the bicycle wheel 100 against the drive roller 182 and maintains a force between the two. The illustrated embodiment has a spring tensioner rod 220 attached to the head bracket 131 so that the spring 221 extends between the tensioner rod 220 and a spring tensioner hook 222 attached to the base tube 173 or alternatively the head tube 132. It is noted that any other suitable configuration for the spring 221 can alternatively be utilized. The illustrated spring 221 is a helical-coil tension spring but any other suitable type of spring can alternatively be utilized.

Figure 19:
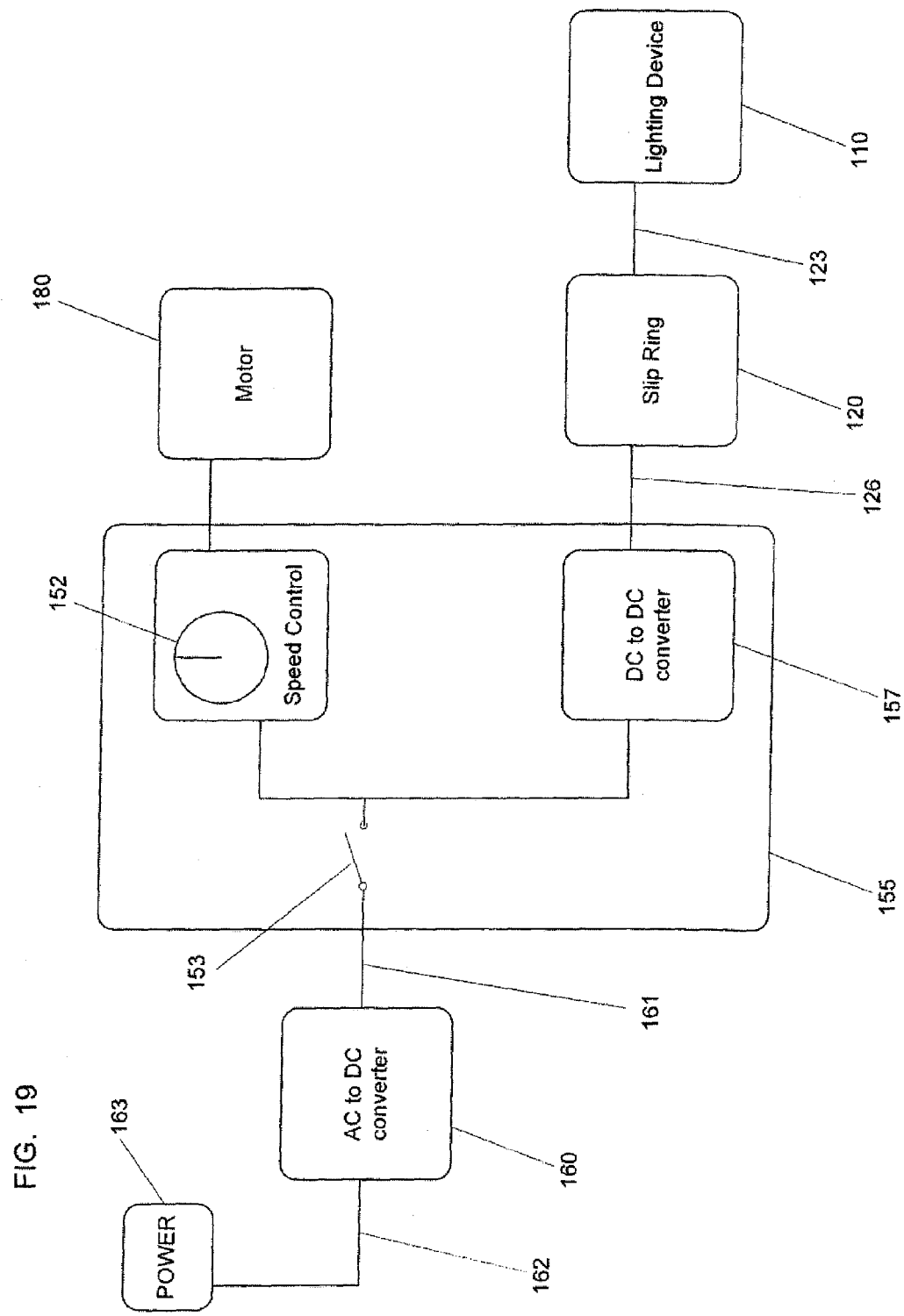
FIG. 19 is an electrical diagram of the stand device of FIGS. 5 to 8.

FIG. 19 illustrates an electrical schematic for the display system where the wall power cable 162 connects the AC/DC converter 160 to the AC power source 163. The DC power cable 161 connects the AC/DC converter to the power on/off switch 153. The power on/off switch 152 is connected in parallel to the speed control 152 and the DC/DC converter 157. The power on/off switch 152, the speed control 152, and the DC/DC converter 157 are each located on the circuit board 155. The speed control 152 is electrically connected to the motor 180. The DC/Dc converter 157 is electrically connected to the slip ring by the wire 126 and the slip ring 120 is electrically connected to the lighting device 110 by the wire 123. The AC/DC converter 160, DC/DC converter 157 and speed control 152 are all well known device or circuits and are available from many suppliers.

Figure 20:
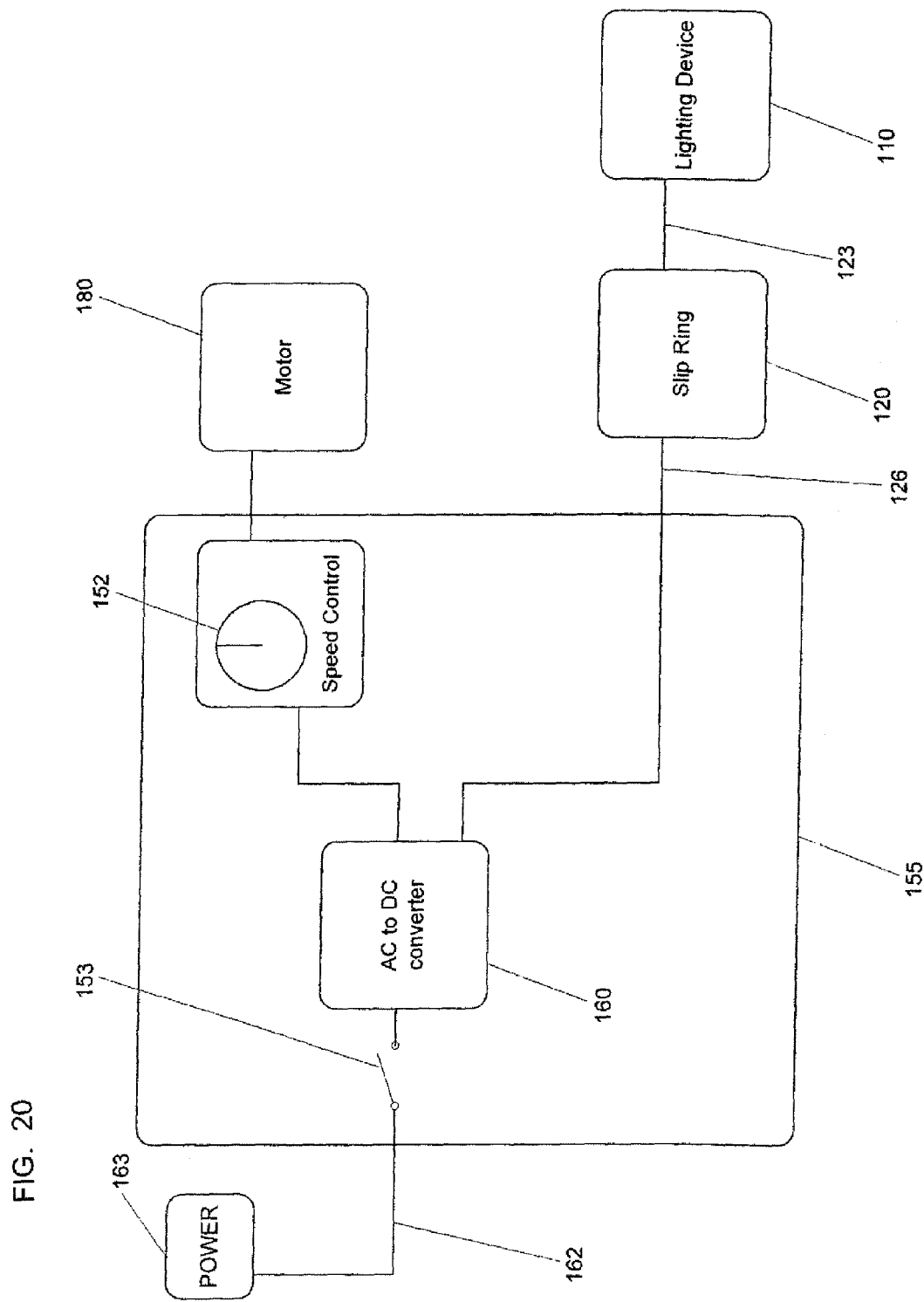
FIG. 20 is an electrical diagram similar to FIG. 19 but showing an alternative embodiment wherein the AC/DC converter is incorporated into the controller circuit board.

FIG. 20 illustrates an alternative electrical schematic which is substantially the same as that shown in FIG. 19, except that the AC/DC converter 160 is incorporated into the circuit board 155. With the AC/DC converter 160 incorporated into the circuit board 155, the DC power cable 161 and the DC/DC converter 157 can each be eliminated.

Figure 21:
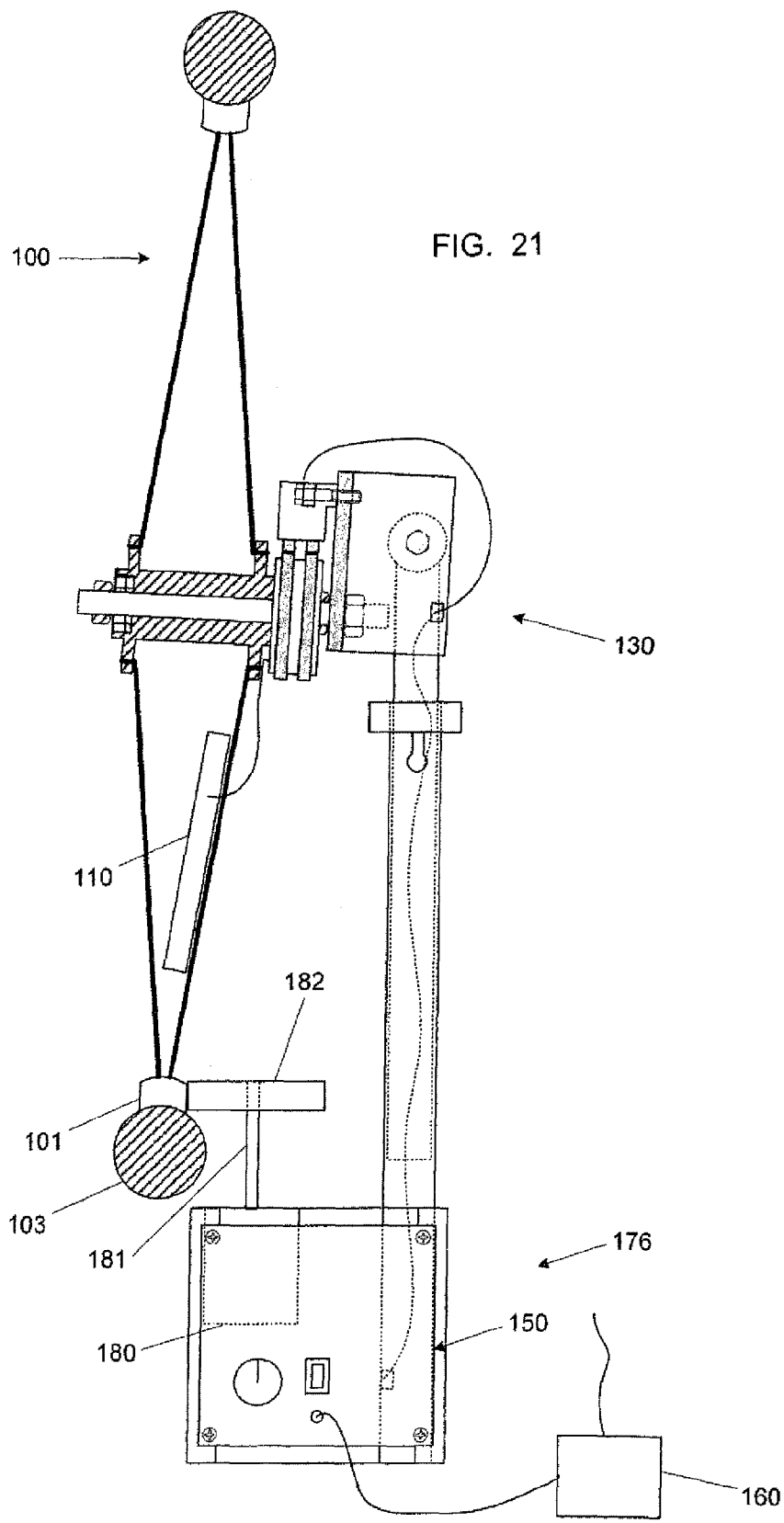
FIG. 21 is a left-side elevational view similar to FIG. 3 but showing a display system according to an alternative embodiment wherein a drive roller contacts a rim of the bicycle wheel rather than the tire of the bicycle wheel.

FIG. 21 illustrates an alternative embodiment of the display system which is substantially the same as the embodiment described hereinabove except that the drive roller 182 engages the side of the bicycle wheel rim 101 instead of the side of the bicycle wheel tire 103. The illustrated drive roller 182 is positioned higher by having a longer drive shaft 182 but it is noted that the drive roller can alternatively be suitably positioned by any other means.

Figure 22:
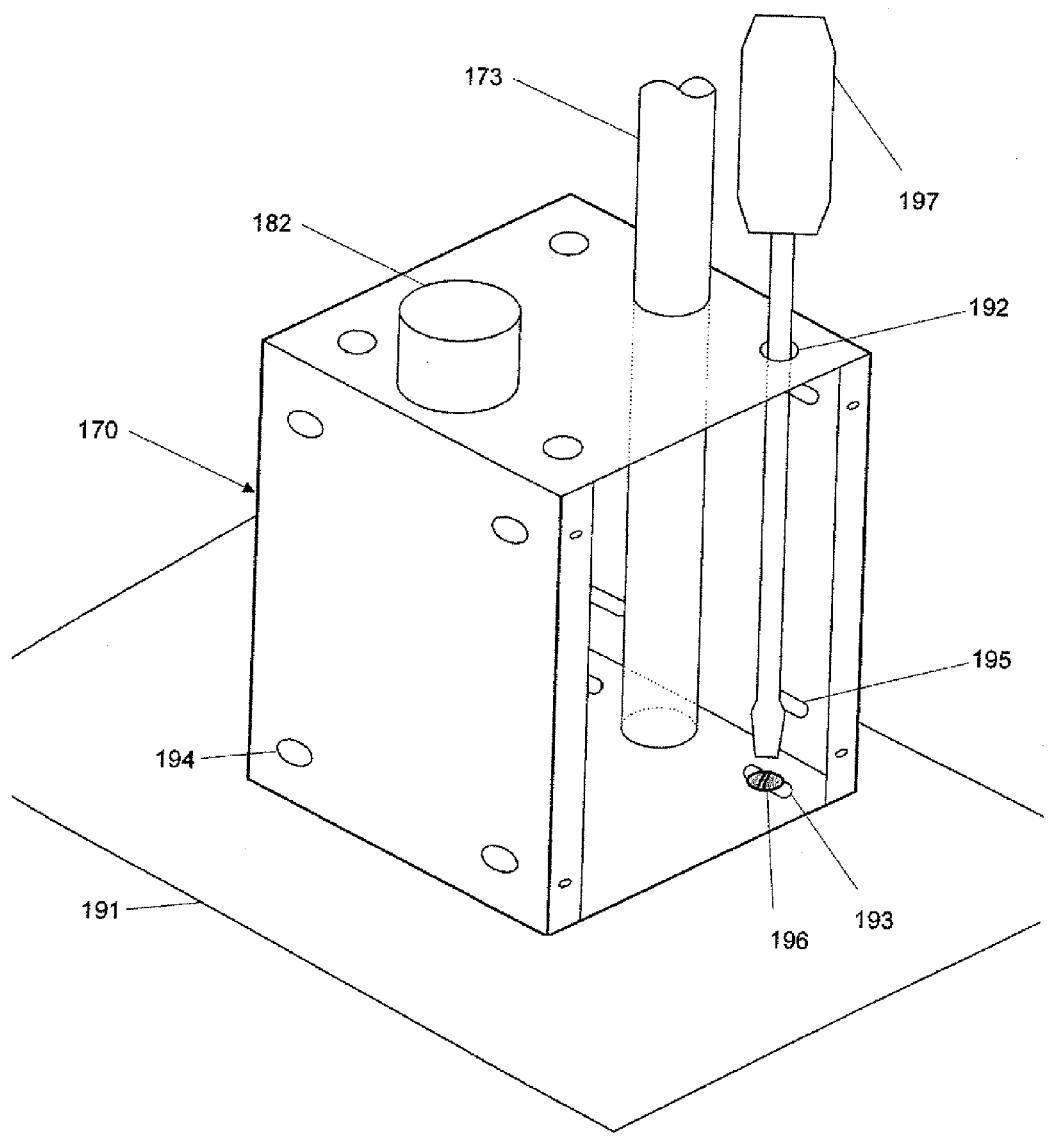
FIG. 22 is an enlarged, fragmented perspective view showing the base assembly of the display systems of FIGS. 1 to 21 being secured on the top of a horizontal support surface such as a table.

FIG. 22 illustrates how the base box 170 can be rigidly secured to a horizontal support surface 191 such as, for example, a tabletop. A plurality of fasteners 196 such as the illustrated screws extend through the mounting openings 193 in the bottom wall of the base box 170 and into the support surface 191. In a preferred embodiment a screw driver has access to the fasteners 196 by extending through the access openings 192 in the top wall of the base box 170 and through the hollow interior of the base box 170 to the fasteners 196. Alternatively, a wrench may inserted into the base box 170 through the open right-side face, such that the access openings 192 in the top wall are not needed.

Figure 23:
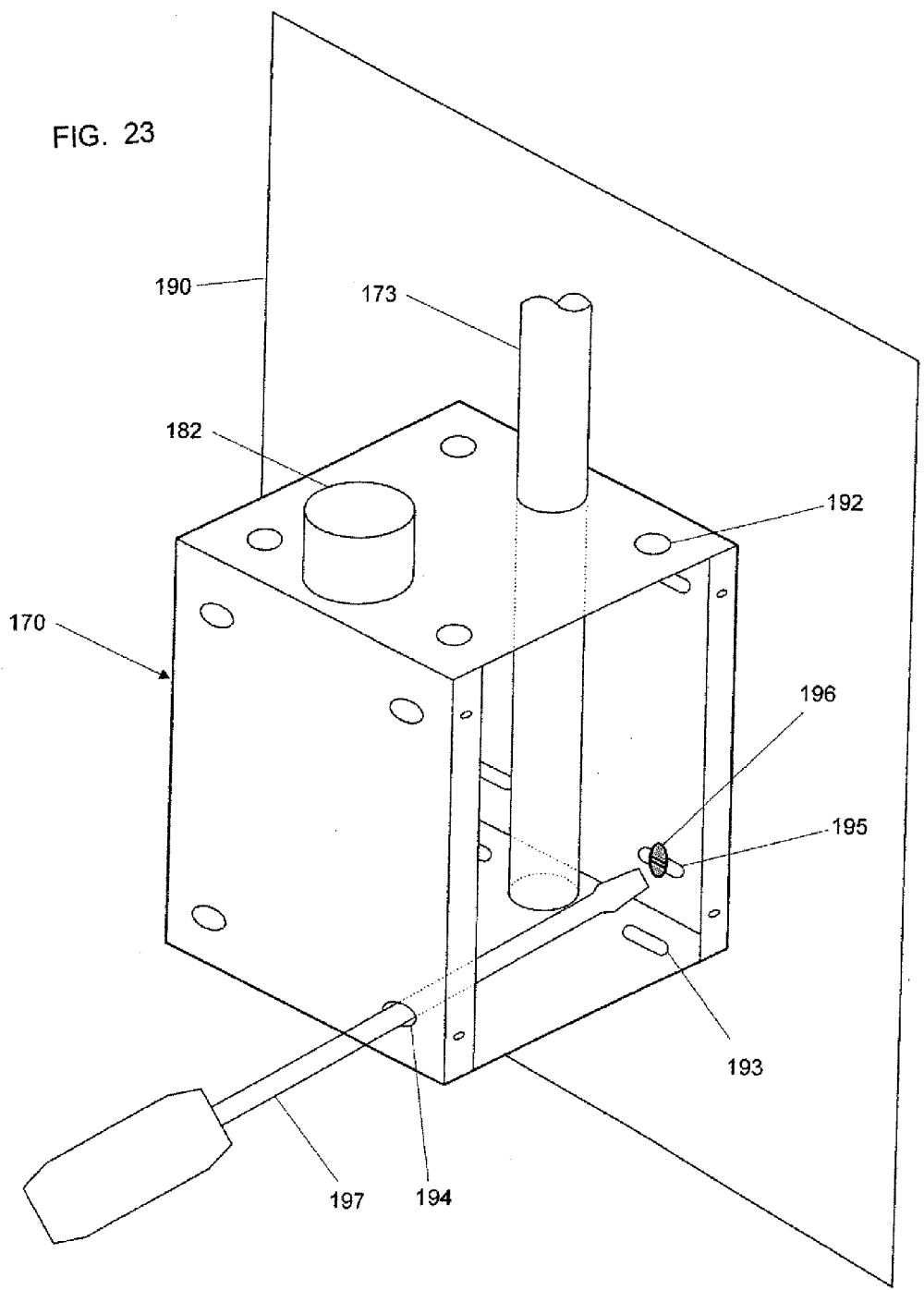
FIG. 23 is an enlarged, fragmented perspective view showing the base assembly of the display systems of FIGS. 1 to 21 being secured to vertical support surface such as a wall.

FIG. 23 illustrates how the base box 170 can alternatively be rigidly secured to a vertical support surface 190 such as, for example, a wall or a video/television wall mounting bracket. A plurality of fasteners 196 such as the illustrated screws extend through the mounting openings 195 in the rear wall of the base box 170 and into the support surface 190. In a preferred embodiment a screw driver has access to the fasteners 196 by extending through the access openings 194 in the front wall of the base box 170 and through the hollow interior of the base box 170 to the fasteners 196. Alternatively, a wrench may be inserted into the base box 170 through the open right-side face, such that the access openings 194 in the front wall are not needed. It should be appreciated that the illustrated display device can advantageously be secured to either horizontal or vertical support surfaces 190, 191.

It is noted that each of the features and variations of the above disclosed embodiments can be used in any combination with each of the other embodiments. Preferably, the stand device 200 is configured so that visibility of the entire area within the inner edge of rim 101 of the bicycle wheel 100 is blocked less than 5% by the stand device 200 on both the front and back sides of the bicycle wheel 100. It is believed that with 5% or less of the area blocked, the blockage will have negligible impact on the viewer. That is, with more than 5% blockage of the area, viewers generally begin realizing that they are not seeing all of the images. In the illustrated embodiments 5% or less blockage is accomplished, for example, by supporting the bicycle wheel 100 on only one side of the axle 105 so visibility of the total area within the inner edge rim 101 of the bicycle wheel 100 is unblocked by the stand device 200 on the front side of the bicycle wheel 100 (that is 0% blockage). Additionally, the upper and lower tubes 132, 173 and the head bracket 131 are sized to minimize blocking from the rear side of the bicycle wheel 100 so that visibility of the entire area within the inner edge of rim 101 of the bicycle wheel 100 is blocked less than 5% by the stand device 200 on the back side of the bicycle wheel 100. In a preferred embodiment, the width of the head bracket 131 is in the range of 40 to 60 mm, the width of the upper tube 132 is in the range of 15 to 22 mm, and the width of the lower tube is in the range of 17 to 25 mm when viewed from the front and rear of the bicycle wheel 100, however any suitable dimensions may be used.

The above described display systems minimize blocking of the visibility of the lighting system from both the front and back sides of the bicycle wheel.

From the foregoing disclosure and detailed description of certain preferred embodiments, it is apparent that the illustrated display devices according to the present invention can be utilized as a continuous-use retail display and minimize blocking of the visibility of the wheel on both sides of the bicycle wheel so that it can be viewed from either side if desired. Additionally, the illustrated display devices according to the present invention are adjustable for use with a variety of different bicycle wheel sized so that a retailer can change the display systems as display needs change. Additionally, the illustrated display devices can be conveniently mounted to either horizontal or vertical surfaces. Additionally, the illustrated display devices are compact in size to allow use in a crowded retail shop or window display. Additionally, the illustrated display devices provide continuous long term operation by using gravity or a spring to maintain a suitable force between the drive roller and the bicycle wheel as they wear. Additionally, the illustrated display devices provide quiet operation by contacting the drive roller with the typical smooth side wall of the tire or rim rather than the rough treaded portion of the tire.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A stand device comprising, in combination:
   a bicycle wheel rotatable about an axle and having a central hub, a rim, and a plurality of spokes extending between the hub and the rim;
   an attachment location where the axle of the bicycle wheel is attached to support the bicycle wheel so that the bicycle wheel can rotate relative to the stand device;
   a drive roller for engaging the bicycle wheel to rotate the bicycle wheel;
   a motor rotating the drive roller; and
   wherein visibility of area within the rim of the bicycle wheel is unblocked by the stand device on one side of the bicycle wheel.

2. The stand device according to claim 1, wherein a distance between the attachment location and the drive roller is adjustable so that the stand device accommodates different sizes of the bicycle wheel.

3. The stand device according to claim 2, wherein the stand device includes an adjustable length tube that adjusts the distance between the attachment location and the drive roller.

4. The stand device according to claim 1, wherein the stand device supports the bicycle wheel through only one end of the axle so that the axle extends from the stand device in a cantilevered manner.

5. The stand device according to claim 1, further comprising a two-contact slip ring attachable to the bicycle wheel and rotatable with the bicycle wheel to provide electrical power to a lighting device attachable to the bicycle wheel and rotatable with the bicycle wheel from the stand device.

6. The stand device according to claim 1, wherein visibility of the area within the rim of the bicycle wheel is blocked less than 5% by the stand device on both sides of the bicycle wheel.

7. The stand device according to claim 1, wherein the motor and the drive roller are secured to the stand device at a fixed location and the attachment location for the bicycle wheel is located on a pivoting portion of the stand device so that gravity pivots the bicycle wheel in a direction to engage the bicycle wheel with the drive roller.

8. The stand device according to claim 7, further comprising a spring for further urging pivoting of the bicycle wheel into engagement with the drive roller.

9. The stand device according to claim 1, wherein a rotational axis of the drive roller is oriented to be substantially perpendicular to a rotational axis of the bicycle wheel so that the drive roller engages a side of the bicycle wheel.

10. A stand device wheel comprising, in combination:
    a bicycle wheel rotatable about an axle;
    an attachment location where the axle of the bicycle wheel is attached to support the bicycle wheel so that the bicycle wheel can rotate relative to the stand device;
    a drive roller for engaging the bicycle wheel to rotate the bicycle wheel;
    a motor rotating the drive roller; and
    wherein the stand device supports the bicycle wheel through only one end of the axle so that the axle extends from the stand device in a cantilevered manner.

11. The stand device according to claim 10, wherein the motor and the drive roller are secured to the stand device at a fixed location and the attachment location for the bicycle wheel is located on a pivoting portion of the stand device so that gravity pivots the bicycle wheel in a direction to engage the bicycle wheel with the drive roller.

12. The stand device according to claim 11, further comprising a spring for further urging pivoting of the bicycle wheel into engagement with the drive roller.

13. The stand device according to claim 10, wherein the bicycle wheel has a central hub, a rim, and a plurality of spokes extending between the hub and the rim, and wherein visibility of area within the rim of the bicycle wheel is unblocked by the stand device on one side of the bicycle wheel and visibility of the area within the rim of the bicycle wheel is blocked no more than 5% by the stand device on an opposite side of the bicycle wheel.

14. The stand device according to claim 10, wherein the bicycle wheel has a central hub, a rim, and a plurality of spokes extending between the hub and the rim, and wherein visibility of the area within the rim of the bicycle wheel is blocked less than 5% by the stand device on both sides of the bicycle wheel.

15. The stand device according to claim 10, wherein a rotational axis of the drive roller is oriented to be substantially perpendicular to a rotational axis of the bicycle so that the drive roller engages a side of the bicycle wheel.

16. A stand device comprising, in combination:
a bicycle wheel rotatable about an axle;
an attachment location where the axle of the bicycle wheel is attached to support the bicycle wheel so that the bicycle wheel can rotate relative to the stand device;
a drive roller for engaging the bicycle wheel to rotate the bicycle wheel;
a motor rotating the drive roller;
a lighting device attachable to the bicycle wheel and rotatable with the bicycle wheel; and
a two-contact slip ring attachable to the bicycle wheel and rotatable with the bicycle wheel to provide electrical power to a lighting device from the stand device.

17. A stand device comprising, in combination:
a bicycle wheel rotatable about an axle;
an attachment location where the axle of the bicycle wheel is attached to support the bicycle wheel so that the bicycle wheel can rotate relative to the stand device;
wherein the stand device includes a drive roller for engaging the bicycle wheel to rotate the bicycle wheel;
a motor rotating the drive roller; and
wherein the stand device includes a base box supporting the bicycle wheel and having a substantially horizontal bottom wall, a substantially vertical rear wall, a plurality of fastener openings in the rear wall for selective attachment of the base box to a substantially vertical support surface, and a plurality of fastener openings in the bottom wall for selective attachment of the base box to a substantially horizontal support surface.

18. The stand device according to claim 17, wherein a substantially vertical front wall has a plurality of access openings opposed to the plurality of fastener openings in the rear wall so that a tool can extend through the front wall to fasteners located in the fastener openings of the rear wall, and a substantially horizontal top wall has a plurality of access openings opposed to the plurality of fastener openings in the bottom wall so that the tool can extend through the top wall to fasteners located in the fastener openings of the bottom wall.

19. The stand device according to claim 17, wherein the motor and the drive roller are secured to the stand device at a fixed location and the attachment location for the bicycle wheel is located on a pivoting portion of the stand device so that gravity pivots the bicycle wheel in direction to engage the bicycle wheel with the drive roller.

20. The stand device according to claim 17, further comprising a two-contact slip ring attachable to the bicycle wheel and rotatable with the bicycle wheel to provide electrical power to a lighting device attachable to the bicycle wheel and rotatable with the bicycle wheel from the stand device.

* * * * *